(12) United States Patent  
Tepedino et al.

(10) Patent No.: US 11,447,002 B2  
(45) Date of Patent: Sep. 20, 2022

(54) ELECTRIC PROPULSION, SUSPENSION, AND STEERING SYSTEMS

(71) Applicant: DRiV Automotive Inc., Lake Forest, IL (US)

(72) Inventors: Gustavo Tepedino, Ann Arbor, MI (US); Rod Hadi, West Bloomfield, MI (US); Thomas Watson, Plymouth, MI (US); Jeff DeBoer, Ann Arbor, MI (US); Scott Stevens, White Lake, MI (US)

(73) Assignee: DRiV Automotive Inc., Skokie, IL (US)

( * ) Notice: Subject to any disclaimer, the term of this patent is extended or adjusted under 35 U.S.C. 154(b) by 402 days.

(21) Appl. No.: 16/780,272

(22) Filed: Feb. 3, 2020

(65) Prior Publication Data

US 2020/0247230 A1 Aug. 6, 2020

Related U.S. Application Data

(60) Provisional application No. 62/800,784, filed on Feb. 4, 2019.

(51) Int. Cl.
*B60K 7/00* (2006.01)
*B60K 1/02* (2006.01)

(52) U.S. Cl.
CPC .............. *B60K 7/0007* (2013.01); *B60K 1/02* (2013.01); *B60K 2007/003* (2013.01)

(58) Field of Classification Search
CPC . H02K 16/00; B25J 9/0084; B25J 9/12; B25J 9/126; B25J 17/0283; B25J 17/0291;

(Continued)

(56) References Cited

U.S. PATENT DOCUMENTS 3,863,363 A * 2/1975 Miyajima .............. G09B 27/02  
434/286  
4,372,407 A 2/1983 McColl  
(Continued)

FOREIGN PATENT DOCUMENTS

CN 101638052 B 1/2012  
CN 104688253 A * 6/2015 .............. A61B 6/00  
(Continued)

OTHER PUBLICATIONS

PCT Notification Concerning Transmittal of International Preliminary Report on Patentability and Written Opinion dated Aug. 19, 2021 (5 pages).

*Primary Examiner* — Tisha D Lewis

(74) *Attorney, Agent, or Firm* — DRiV Automotive Inc.

(57) ABSTRACT

A wheel assembly includes a wheel defining a first axis; a first electric motor including a first stator and a first rotor rotatable relative to the first stator about the first axis, the wheel fixed relative to the first rotor; a second electric motor including a second stator and a second rotor rotatable relative to the second stator about a second axis, the first stator fixed relative to the second rotor; and a third electric motor including a third stator and a third rotor rotatable relative to the third stator about a third axis, the second stator coupled to and movable with the third rotor. The first axis, the second axis, and the third axis are mutually transverse.

20 Claims, 25 Drawing Sheets

(58) Field of Classification Search
CPC ............ B60K 7/0007; B60K 2007/003; B60K 2007/0038; B60K 2007/0061; B60K 2007/0069; B60K 2007/0084; B60K 2007/0092
See application file for complete search history.

(56) References Cited

U.S. PATENT DOCUMENTS

| | | | |
|---|---|---|---|
| 8,424,625 B2 * | 4/2013 | Ishii | B60W 20/00 180/65.51 |
| 10,065,451 B2 * | 9/2018 | Park | B60B 27/0021 |
| 10,506,334 B1 * | 12/2019 | Shukla | H02K 33/18 |
| 10,507,586 B2 * | 12/2019 | Tokuda | H02K 11/33 |
| 2007/0240928 A1 | 10/2007 | Coltson et al. | |
| 2010/0025131 A1 | 2/2010 | Gloceri et al. | |
| 2015/0291060 A1 | 10/2015 | Zhao | |
| 2018/0076701 A1 | 3/2018 | Hunter et al. | |

FOREIGN PATENT DOCUMENTS

| | | | | |
|---|---|---|---|---|
| EP | 0484548 A1 * | 5/1992 | ............ | B60K 11/02 |
| KR | 1020090045971 A | 5/2009 | | |
| KR | 1020150012267 A | 2/2015 | | |

\* cited by examiner

ELECTRIC PROPULSION, SUSPENSION, AND STEERING SYSTEMS

CROSS-REFERENCE TO RELATED APPLICATIONS

This patent application claims priority to and all the benefits of U.S. Provisional Patent Application No. 62/800,784 filed on Feb. 4, 2019, which is herein incorporated by reference in its entirety.

BACKGROUND

Shock absorbers are typically used in conjunction with automotive suspension systems or other suspension systems to absorb vibrations that occur during movement of the suspension system. In order to absorb these vibrations, automotive shock absorbers are generally connected between the sprung (body) and the unsprung (suspension/drivetrain) masses of a vehicle.

Some types of vehicles include only an internal combustion engine that generates propulsion torque. Other types of vehicles include only one or more electric motors that generate propulsion torque. Yet other types of vehicles include both an internal combustion engine and one or more electric motors that generate propulsion torque.

DETAILED DESCRIPTION

Figure 1:
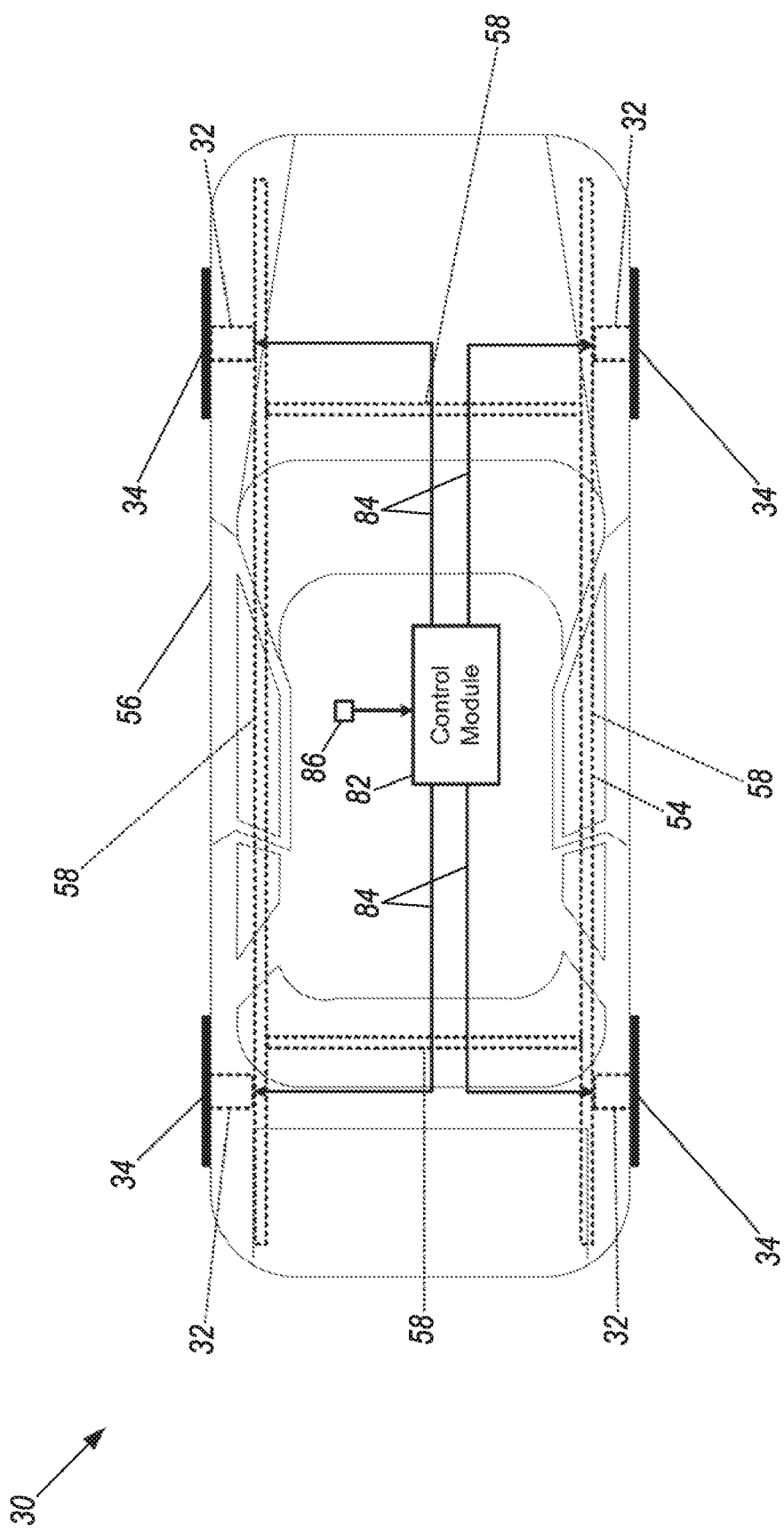
FIG. 1 is a diagrammatic top view of an example vehicle.
Figure 2:
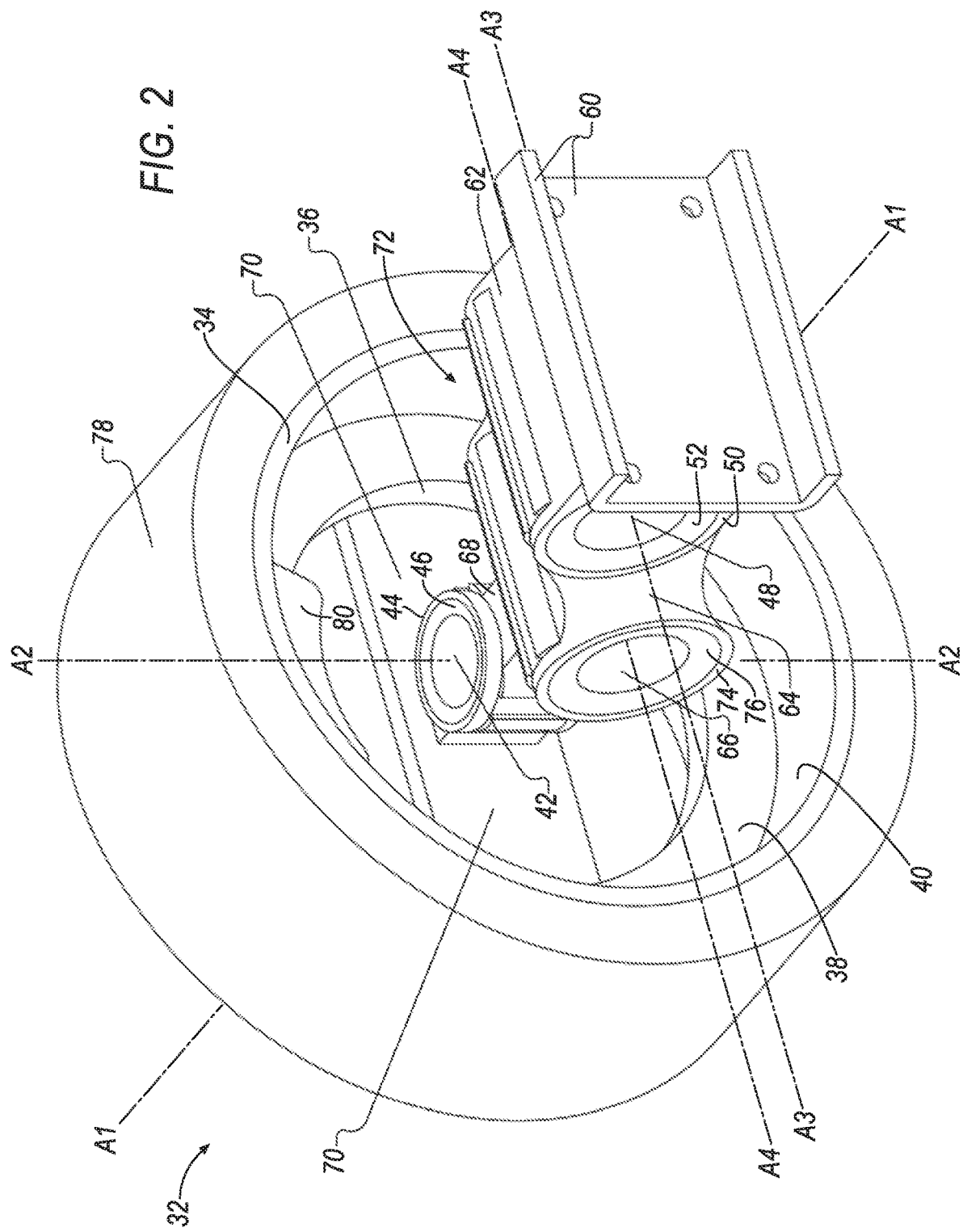
FIG. 2 is a perspective view of an example wheel assembly of the vehicle.
Figure 3:
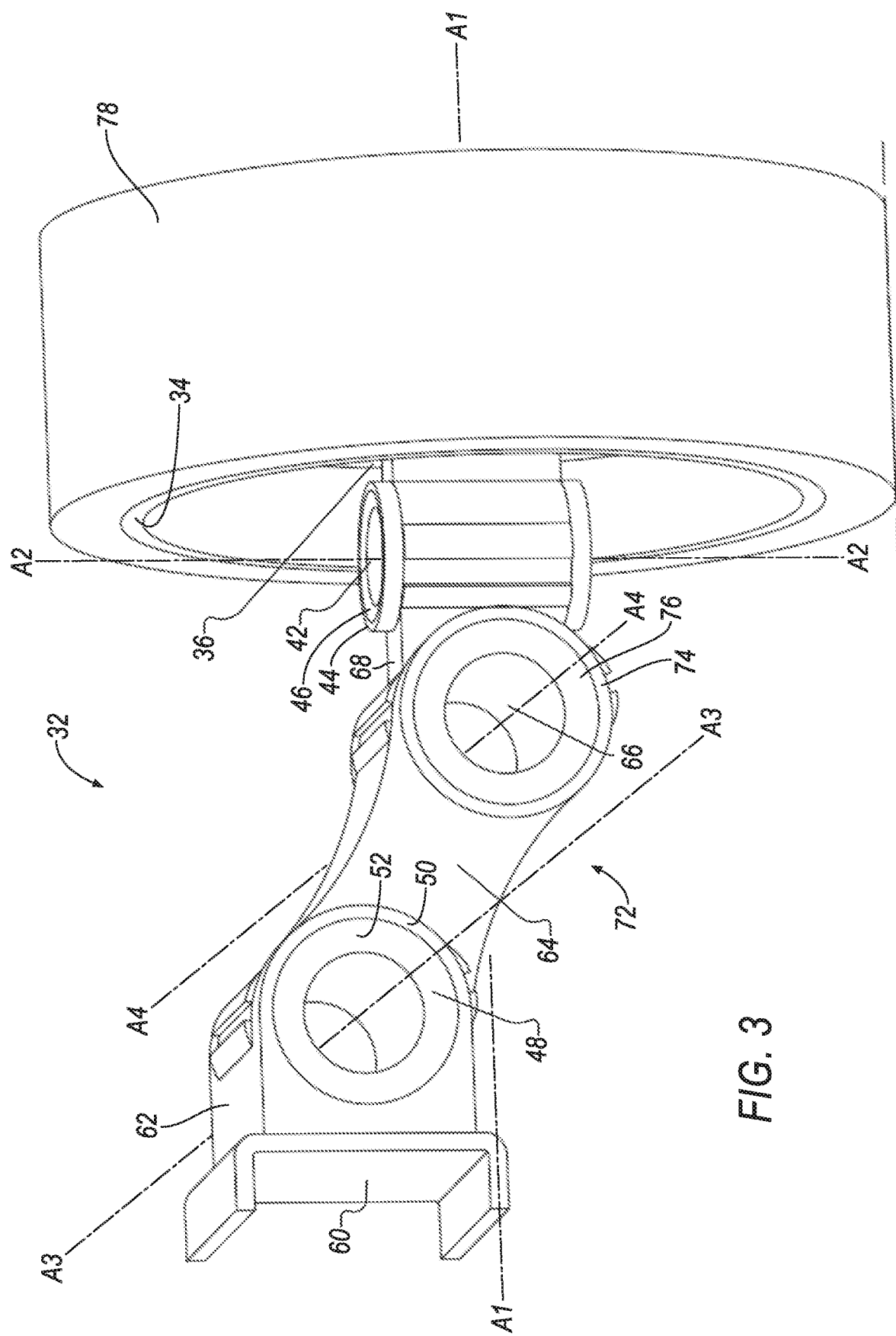
FIG. 3 is another perspective view of the wheel assembly of the vehicle.
Figure 4:
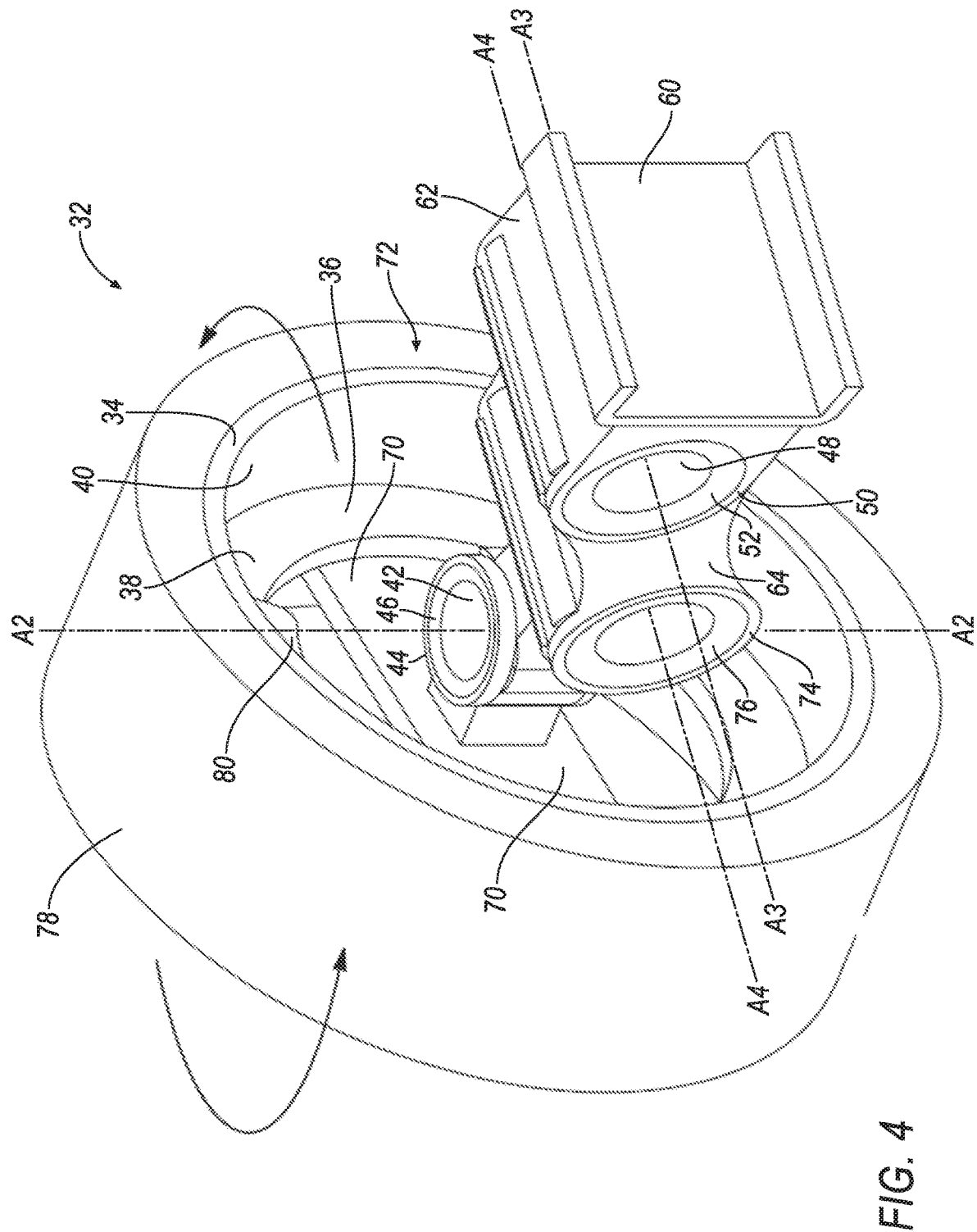
FIGS. 4-7 are perspective views of the wheel assembly with a second electric motor actuating.
Figure 5:
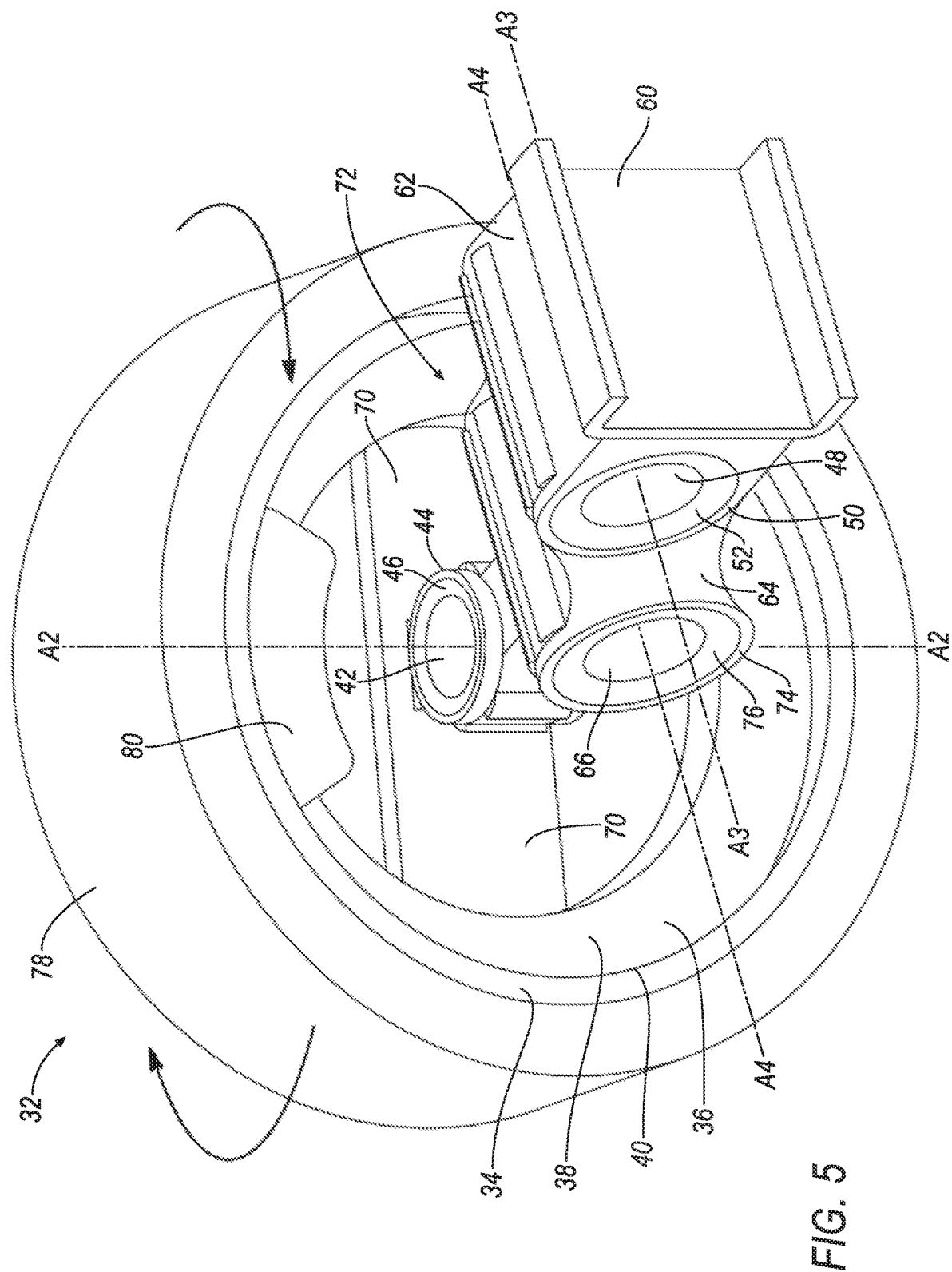
Figure 6:
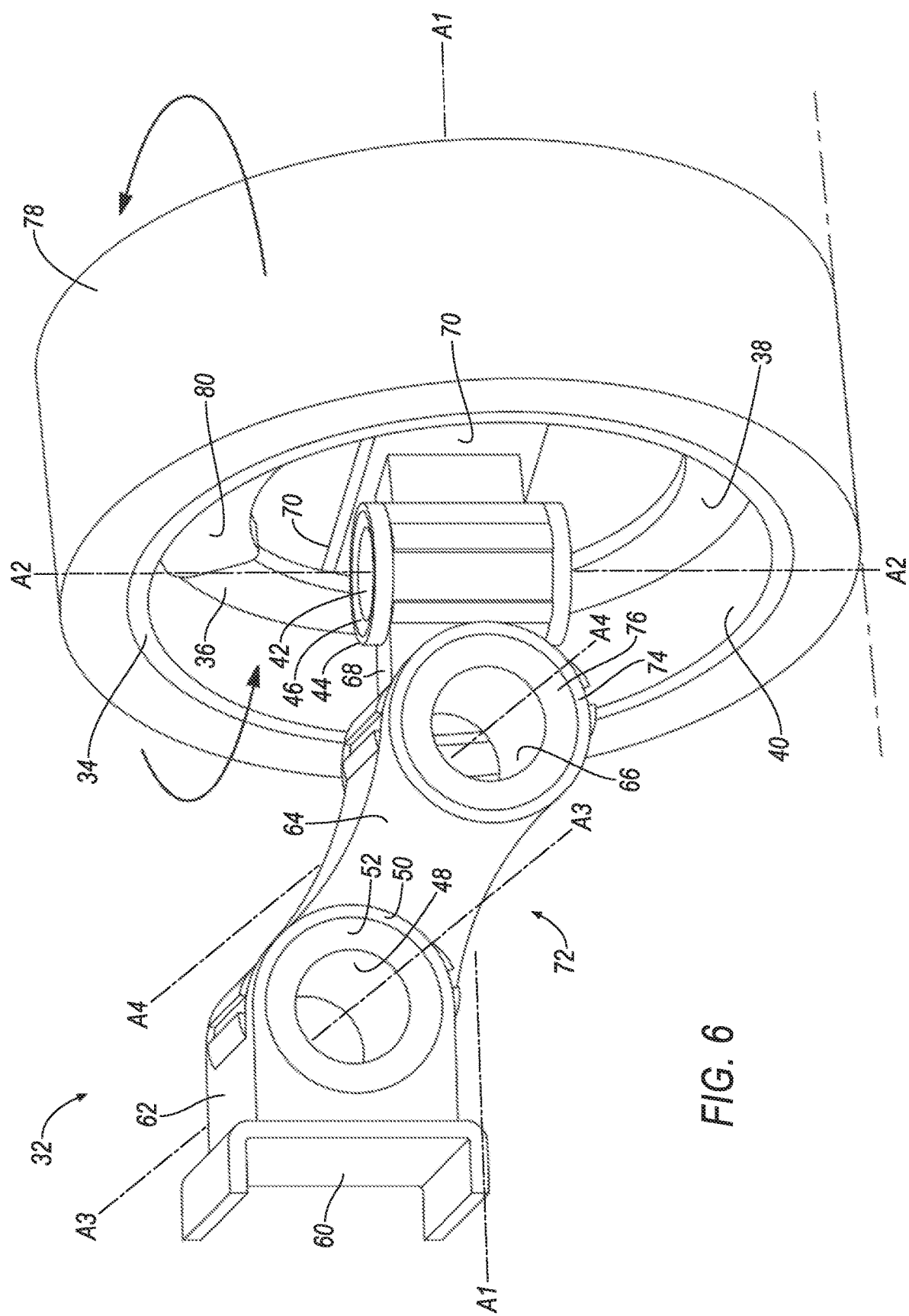
Figure 7:
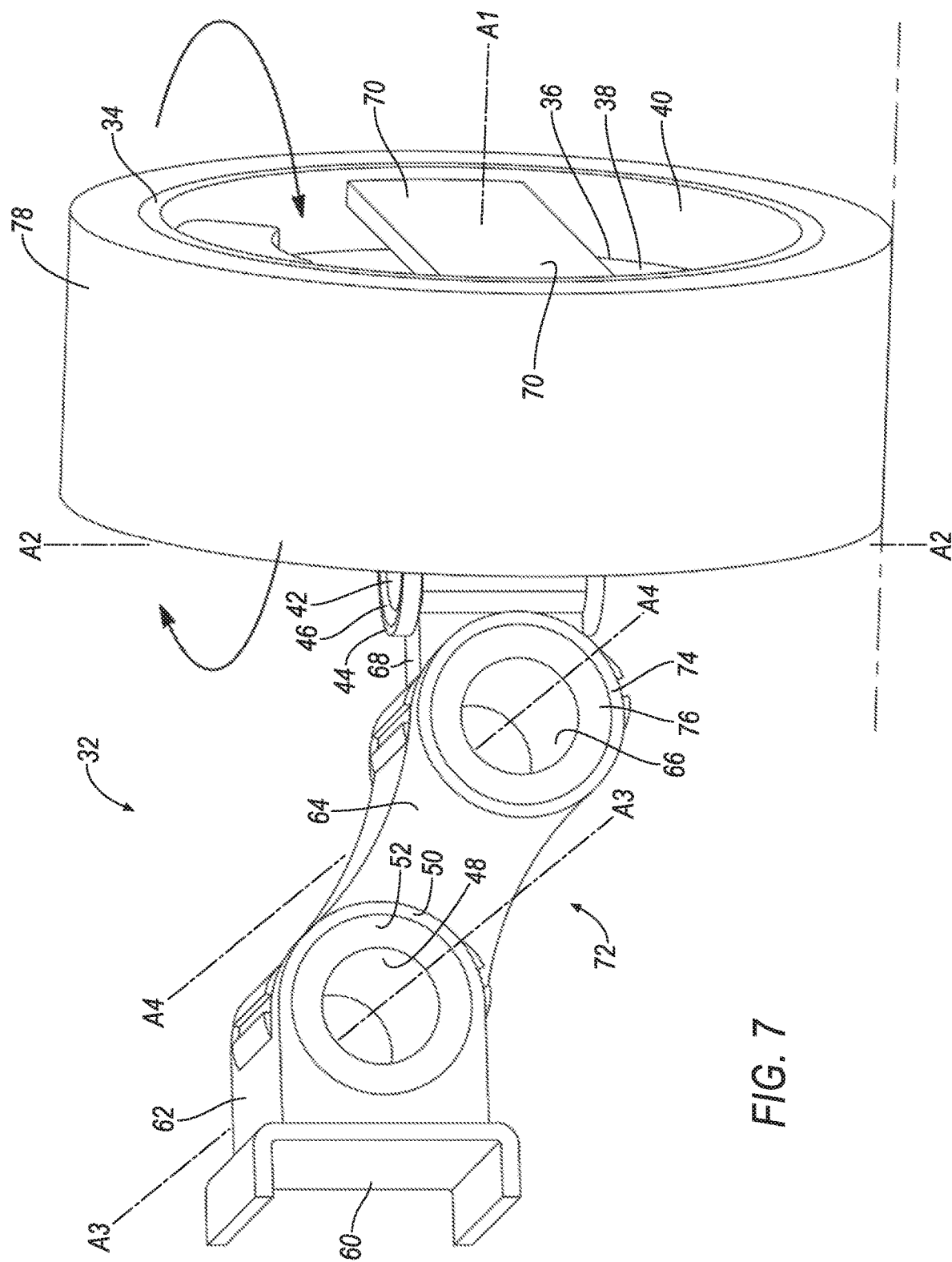
Figure 8:
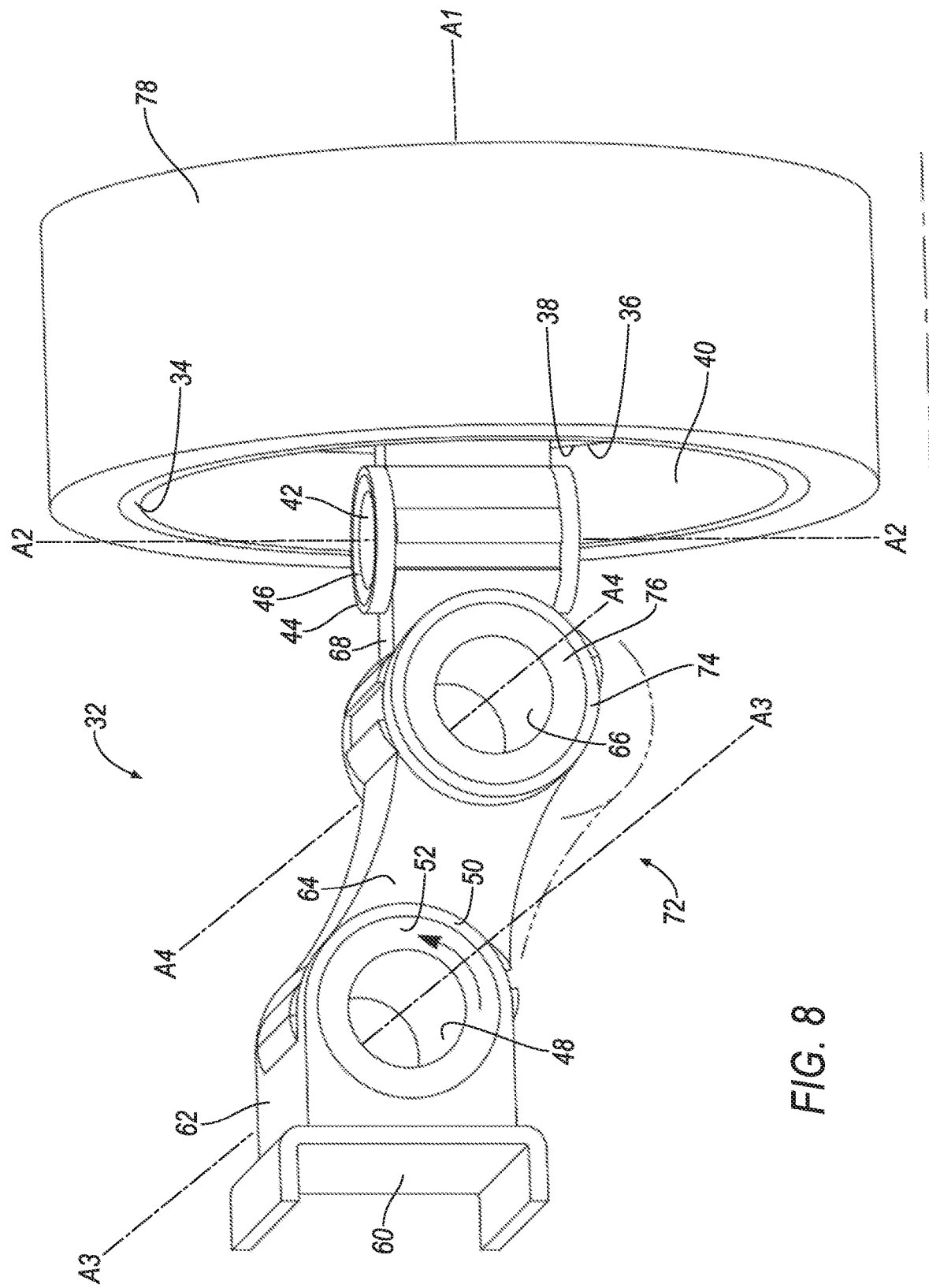
FIG. 8 is a perspective view of the wheel assembly with a third electric motor actuating.
Figure 9:
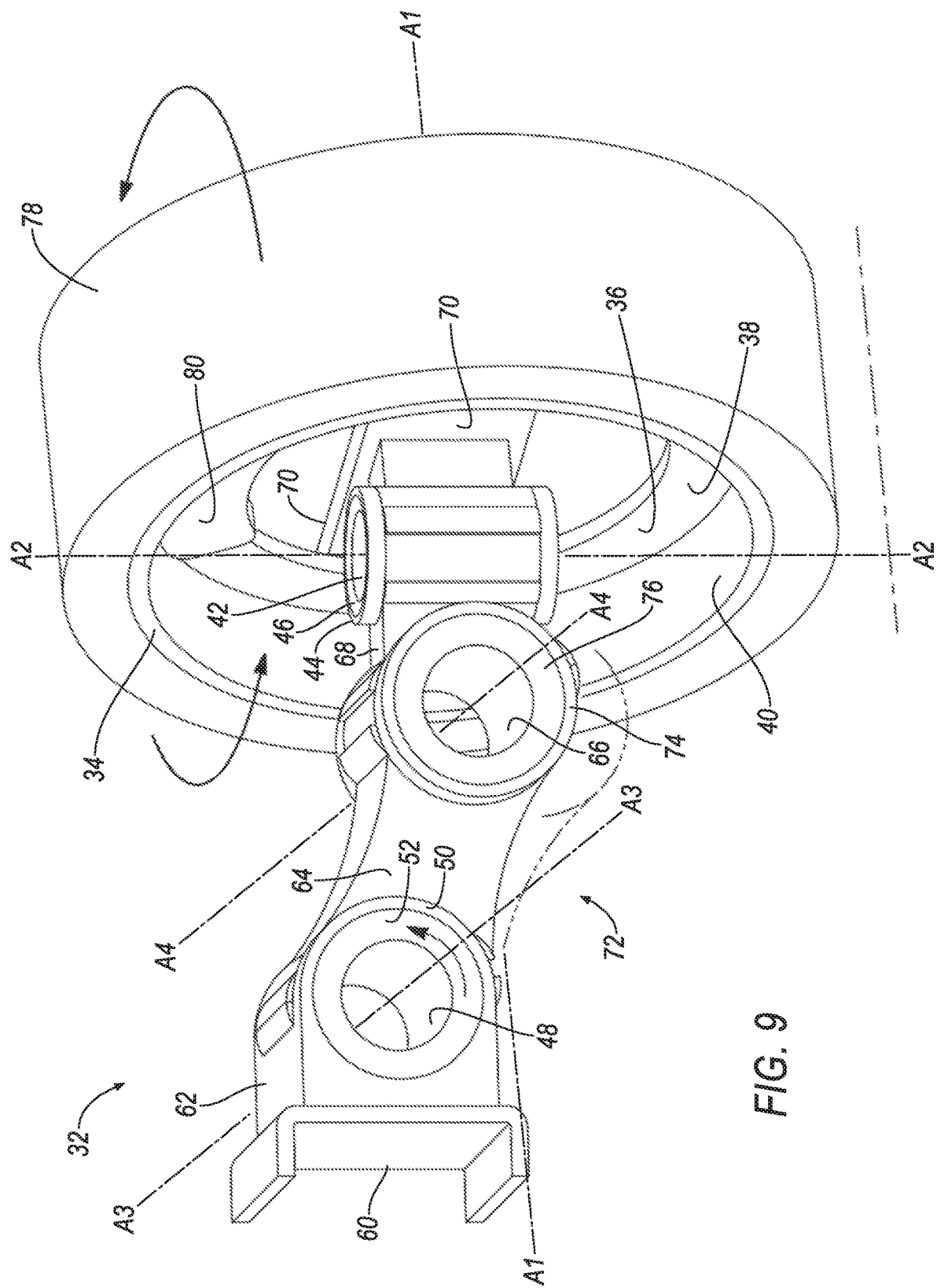
FIGS. 9-10 are perspective views of the wheel assembly with the second and third electric motors actuating.
Figure 10:
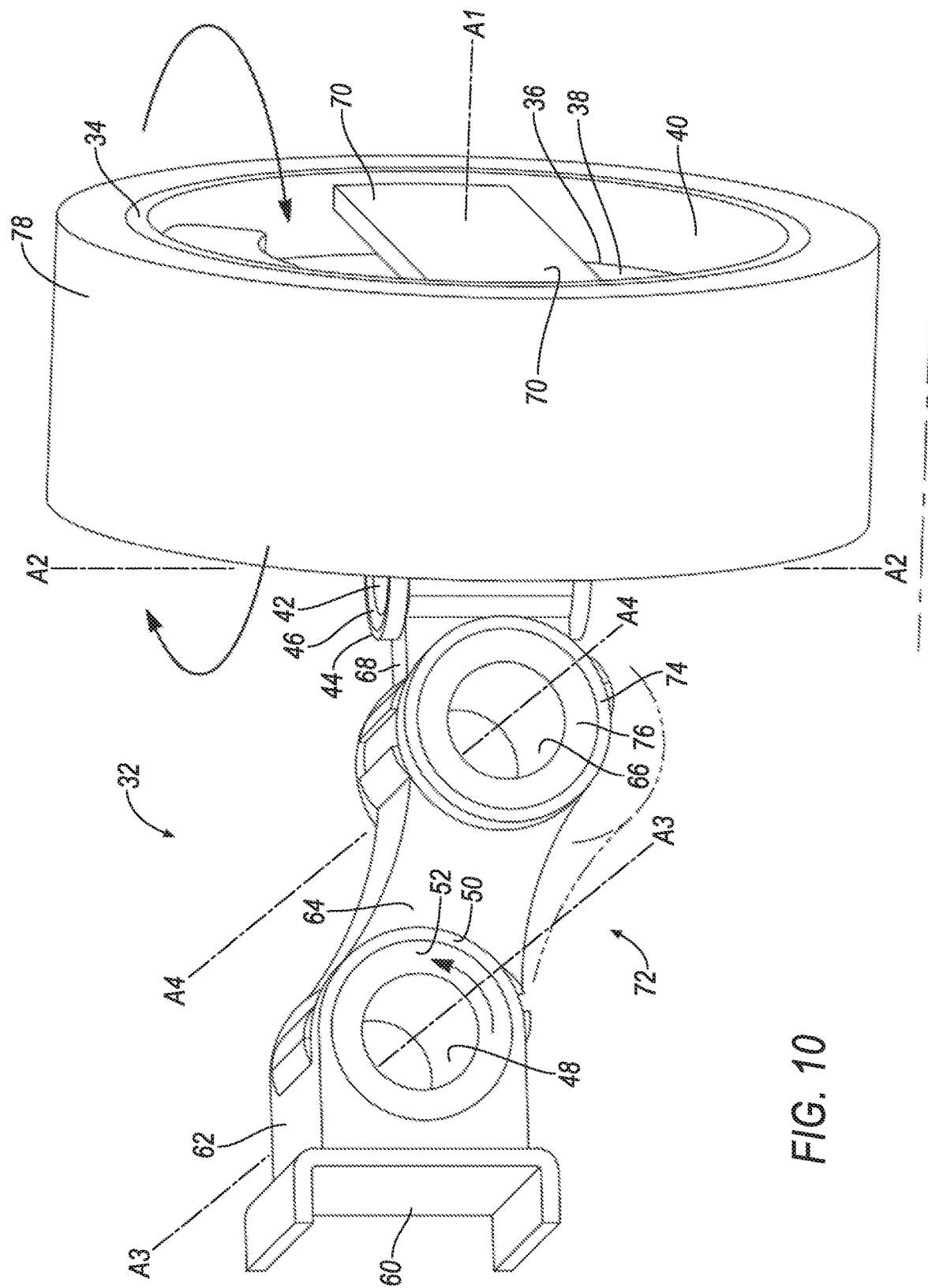

A wheel assembly 32 described herein serves the functions of propulsion, suspension, and steering for a vehicle 30. The wheel assembly 32 provides a greater level of control of the propulsion, suspension, and steering of the vehicle 30. The vehicle 30 can include wheel assemblies 32 for all the wheels 34, and each wheel assembly 32 of a vehicle 30 can be controlled independently of the other wheel assemblies 32. The wheel assembly 32 includes a plurality of electric motors 36, 42, 48, 66. The first electric motor 36 can provide propulsion for the vehicle 30; in other words, the first electric motors 36 are in-wheel drive motors to propel the vehicle 30. The first electric motors 36 substitute for a conventional powertrain, eliminating the need for mechanical linkages from a vehicle chassis 54 to drive the wheels 34. Instead, only electrical power needs to be provided to the first electric motors 36. The first electric motors 36 may also provide regenerative braking. The second electric motors 42 can provide steering for each wheel 34 individually and serve as a steer-by-wire system. The second electric motors 42 replace a conventional rack-and-pinion steering system and eliminate the need for mechanical linkages from the vehicle chassis 54 for turning the wheels 34. The second electric motors 42 can also be used to independently adjust a toe angle for one or more wheels 34. The third electric motors 48, as well as possibly the fourth electric motors 66, serve as a suspension system for the vehicle 30. Each third electric motor 48 and (if present) corresponding fourth electric motor 66 can provide damping for one of the wheels 34 relative to the vehicle chassis 54, allowing vertical travel of the wheel 34 while absorbing energy from a shock. The third electric motors 48 may also be used to adjust a ride height of the vehicle 30.

Moreover, the wheel assemblies 32 provide a compact arrangement of these functions and occupy significantly less space than traditional propulsion, steering, and suspension systems. Each wheel assembly 32 provides the sole attachment of the respective wheel 34 to the vehicle chassis 54. The electric motors 36, 42, 48, 66 are each a rotary electric motor having a stator 38, 44, 50, 74 and a rotor 40, 46, 52, 76. The electric motors 36, 42, 48, 66 are linked together successively from the vehicle chassis 54 to the wheel 34, with the rotor 40, 46, 52, 76 of each electric motor 36, 42, 46, 66 fixed relative to the stator 38, 44, 50, 74 of the next electric motor 36, 42, 46, 66: the vehicle chassis 54 is fixed relative to the third stator 50, the third rotor 52 is fixed relative to the fourth stator 74 (if present, otherwise to the second stator 44), the fourth rotor 76 is fixed relative to the second stator 44, the second rotor 46 is fixed relative to the first stator 38, and the first rotor 40 is fixed relative to the wheel 34. This arrangement forms an arm 72 from the vehicle chassis 54 to the wheel 34 that is a compact arrangement of parts while still accommodating the different types of movement of the wheel 34 that accomplish the functions of propulsion, steering, and suspension.

Additionally, the wheel assemblies 32 provide a modular package that can be fitted to many different designs of the vehicle 30. Each wheel assembly 32 only needs a single physical attachment point to the vehicle chassis 54 and an electrical hookup. The wheel assemblies 32 do not need to be connected to a powertrain or to a steering-system rack of the vehicle 30. This provides flexibility when designing the vehicle 30, e.g., the layout of the power-storage and power-generation components.

With reference to the Figures, the wheel assembly 32 includes the wheel 34 defining a first axis A1; the first electric motor 36 including the first stator 38 and the first rotor 40 rotatable relative to the first stator 38 about the first axis A1, the wheel 34 fixed relative to the first rotor 40; the second electric motor 42 including the second stator 44 and the second rotor 46 rotatable relative to the second stator 44 about a second axis A2, the first stator 38 fixed relative to the second rotor 46; and the third electric motor 48 including the third stator 50 and the third rotor 52 rotatable relative to the third stator 50 about a third axis A3, the second stator 44 coupled to and movable with the third rotor 52. The first axis A1, the second axis A2, and the third axis A3 are mutually transverse.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a vehicle chassis 54. The vehicle 30 may be of a unibody construction, in which the vehicle chassis 54 and a body 56 of the vehicle 30 are a single component. The vehicle 30 may, alternatively, be of a body-on-frame construction, as shown in FIG. 1, in which the vehicle chassis 54 supports the body 56 that is a separate component from the vehicle chassis 54. The vehicle chassis 54 includes a plurality of vehicle chassis members 58 rigidly attached together forming the vehicle chassis 54, e.g., two longitudinal vehicle chassis members 58 (i.e., rails) and at least two lateral vehicle chassis members 58 connecting the two longitudinal vehicle chassis members 58 (i.e., crossmembers). The vehicle chassis 54 and the body 56 may be formed of any suitable material, for example, steel, aluminum, etc.

The vehicle 30 includes multiple wheel assemblies 32, e.g., four wheel assemblies 32, as shown in FIG. 1. The wheel assemblies 32 are mounted to the vehicle chassis 54. The vehicle 30 can have two wheel assemblies 32 lateral to each other on opposite sides of the vehicle 30 toward the front of the vehicle 30, and two wheel assemblies 32 lateral to each other on opposite sides of the vehicle 30 toward the rear of the vehicle 30.

The vehicle 30 includes a control module 82. The control module 82 is a microprocessor-based computing device, e.g., an electronic controller or the like. The control module 82 can include a processor, a memory, etc. The memory of the control module 82 includes media for storing instructions executable by the processor as well as for electronically storing data and/or databases. The control module 82 can be multiple control modules coupled together.

Wires 84 that connect the first, second, third, and fourth electric motors 36, 42, 48, 66 to the control module 82 for powering and controlling the electric motors 36, 42, 48, 66 may extend through the arm 72 or be routed to the first, second, third, and fourth electric motors 36, 42, 48, 66 in another manner.

The vehicle 30 may include sensors 86 communicatively coupled to the control module 82. The sensors 86 may provide data about operation of the vehicle 30, for example, wheel speed, wheel orientation, and engine and transmission data (e.g., temperature, fuel consumption, etc.). The sensors 86 may detect the location and/or orientation of the vehicle 30. For example, the sensors 86 may include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. The sensors 86 may detect the external world, e.g., objects and/or characteristics of surroundings of the vehicle 30, such as other vehicles, road lane markings, traffic lights and/or signs, pedestrians, etc. For example, the sensors 86 may include radar sensors, scanning laser range finders, light detection and ranging (LIDAR) devices, and image processing sensors such as cameras. The sensors 86 may include communications devices, for example, vehicle-to-infrastructure (V2I) or vehicle-to-vehicle (V2V) devices.

The control module 82 is programmed to control the electric motors 36, 42, 48, 66 based on one or more driver inputs and/or one or more other parameters measured by the sensors 86. Examples of driver inputs include, but are not limited to, steering-wheel angle (SWA), accelerator-pedal position, and brake-pedal position. SWA is may be measured using a SWA sensor. Accelerator-pedal position and brake-pedal position may be measured using accelerator-pedal-position and brake-pedal-position sensors, respectively.

The control module 82 is programmed to control the respective electric motors 36, 42, 48, 66 of the four wheel assemblies 32 independently of each other. For example, the control module 82 can actuate all four third electric motors 48 to change a ride height of the vehicle chassis 54, and the control module 82 can actuate the two rear third electric motors 48 to adjust a height of the vehicle 30 at the rear to compensate for a heavy load being placed in the vehicle 30, without actuating the two front third electric motors 48. For another example, the control module 82 can actuate two or four of the second electric motors 42 together to turn the vehicle 30 while driving, and the control module 82 can actuate one of the second electric motors 42 to adjust a toe angle of the respective wheel 34, without actuating the other three second electric motors 42.

The rest of this description generally discusses a single wheel assembly 32, and the description of that wheel assembly 32 applies to each wheel assembly 32 of the vehicle 30. A first example of the wheel assembly 32 is shown in FIGS. 2-13, a second example of the wheel assembly 32 is shown in FIGS. 14-19, and a third example of the wheel assembly 32 is shown in FIGS. 20-25. With reference to the example of FIGS. 2-13, the wheel assembly 32 includes (in order of connection from the vehicle chassis member 58 to the wheel 34) a mounting plate 60, a mounting-plate segment 62, the third electric motor 48, an upper arm segment 64, a fourth electric motor 66, a lower arm segment 68, the second electric motor 42, struts 70, the first electric motor 36, and the wheel 34. Alternatively, as shown in the example in FIGS. 14-19 and in the example shown in FIGS. 20-25, the wheel assembly 32 can lack the fourth electric motor 66 and the lower arm segment 68, and the upper arm segment 64 can be connected directly to second electric motor 42.

With reference to FIGS. 2-25, the wheel assembly 32 includes the arm 72. The arm 72 includes the mounting-plate segment 62, the third electric motor 48, the upper arm segment 64, the fourth electric motor 66 (if present), the lower arm segment 68 (if present), and the second electric motor 42. The arm 72 has an elongated, articulable shape that extends from the mounting plate 60 to a point radially inside the wheel 34. The wheel 34 is connected to the mounting plate 60 only via the arm 72; i.e., there is no set of connections from the wheel 34 to the mounting plate 60 (including to elsewhere on the vehicle chassis 54) that bypasses the arm 72.

The electric motors 36, 42, 48, 66 are radial electric motors. The electric motors 36, 42, 48, 66 are each actuatable to rotate a respective rotor 40, 46, 52, 76 about a respective axis relative to a respective stator 38, 44, 50, 74. Like the first electric motor 36, second electric motor 42, and third electric motor 48, the fourth electric motor 66 includes a fourth stator 74 and a fourth rotor 76 rotatable relative to the fourth stator 74 about a fourth axis A4. One or more of the electric motors 36, 42, 48, 66 are radial flux electric motors, e.g., a LiveDrive radial motor manufactured by Genesis Robotics.

The mounting plate 60 can have a flat shape and/or be shaped to match a shape of the vehicle chassis member 58.

The mounting plate 60 is mounted to one of the vehicle chassis members 58. For example, the mounting plate 60 can include bolt holes through which the mounting plate 60 is bolted to the vehicle chassis member 58, the mounting plate 60 can be welded to the vehicle chassis member 58, etc.

The mounting plate 60 and the third stator 50 of the third electric motor 48 are fixed relative to each other. The mounting-plate segment 62 extends from the mounting plate 60 to the third stator 50 and rigidly connects the third stator 50 and the mounting plate 60. The mounting-plate segment 62 does not include any moving parts.

The third electric motor 48 includes the third stator 50 and the third rotor 52 rotatable relative to the third stator 50 about the third axis A3. The third stator 50 is fixed relative to the vehicle chassis 54 via the mounting-plate segment 62 and the mounting plate 60. The third axis A3 is oriented in a vehicle-forward direction, i.e., longitudinally along the vehicle 30.

The third electric motor 48 effectuates vertical travel of the wheel 34 relative to the vehicle chassis 54. The third electric motor 48 can operate as a suspension system, e.g., as a damper and spring, for the wheel 34 relative to the vehicle chassis 54. The control module 82 can be programmed to, in response to electrical data from the third electric motor 48 indicating vertical motion of the wheel 34 (e.g., caused by a bump or pothole), actuate the third electric motor 48 in a direction resisting the vertical motion to return the third electric motor 48 to a default position. The third electric motor 48 is actuatable to lift or lower the wheel 34 relative to the vehicle chassis 54, e.g., by the control module 82 changing the default position of the third electric motor 48. The third electric motor 48 can also tilt the wheel 34, i.e., adjust the camber of the wheel 34, relative to the vehicle chassis 54. Actuation of the third electric motor 48 is shown in FIGS. 8-10, 17-19, and 23-25. The third electric motor 48 can act as a regenerative damper and spring, i.e., generating energy by resisting the up-and-down motion of the wheel 34.

With reference to the example wheel assembly 32 in FIGS. 2-13, the third rotor 52 and the fourth stator 74 are fixed relative to each other. The upper arm segment 64 extends from the third rotor 52 to the fourth stator 74 and rigidly connects the third rotor 52 and the fourth stator 74. When the third electric motor 48 is in the default position, the upper arm segment 64 extends in downward and outboard direction from the third rotor 52 to the fourth stator 74. This orientation provides room for the wheel 34 to travel upward in response to road shocks. The upper arm segment 64 does not include any moving parts.

The fourth electric motor 66 includes the fourth stator 74 and the fourth rotor 76 rotatable relative to the fourth stator 74 about the fourth axis A4. The fourth stator 74 is fixed relative to the third rotor 52 via the upper arm segment 64. The fourth axis A4 and the third axis A3 are parallel. The fourth axis A4 is oriented in a vehicle-forward direction, i.e., longitudinally along the vehicle 30. The fourth electric motor 66 can be disposed on the first axis A1.

Figure 11:
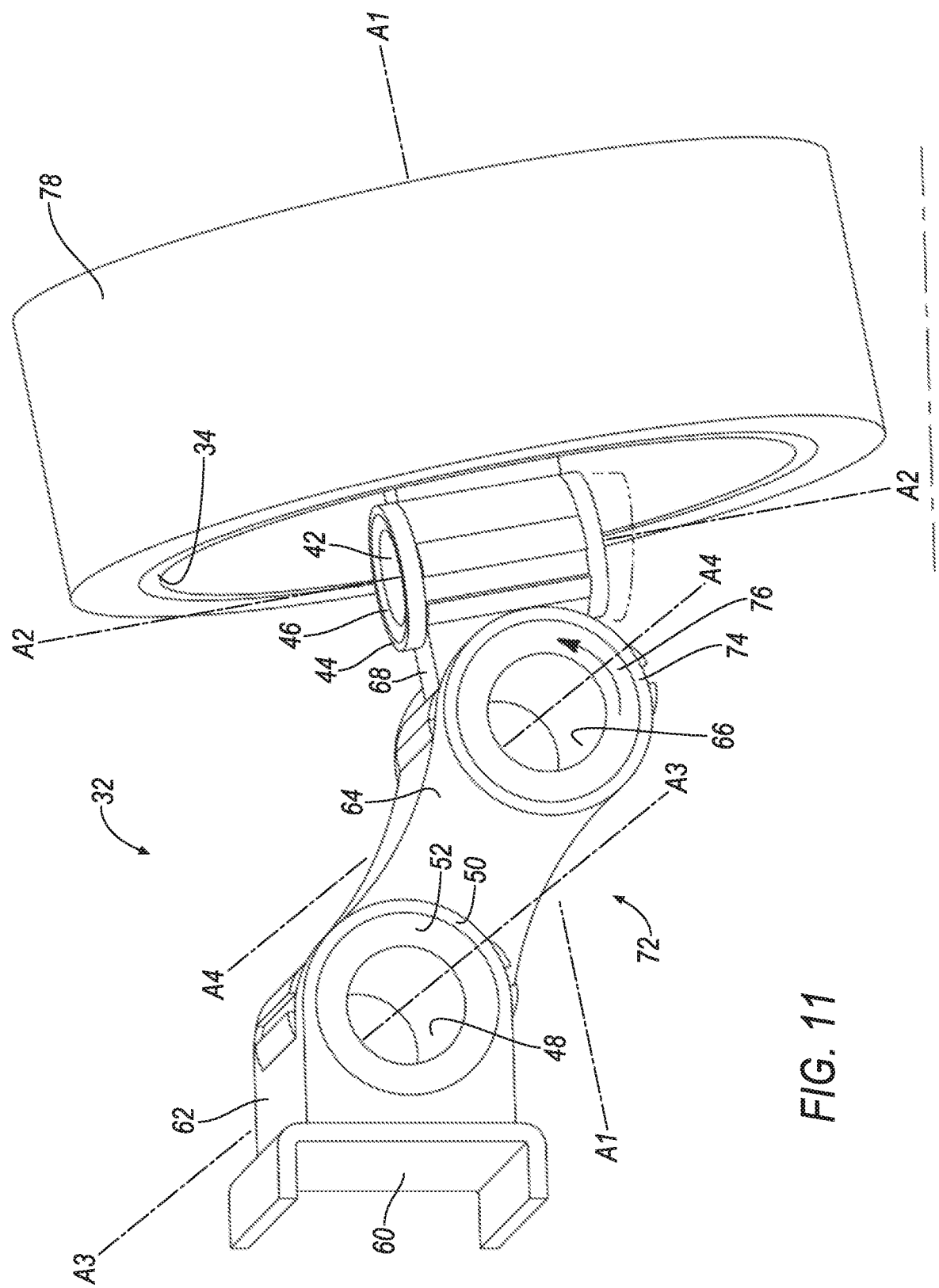
FIG. 11 is a perspective view of the wheel assembly with a fourth electric motor actuating.
Figure 12:
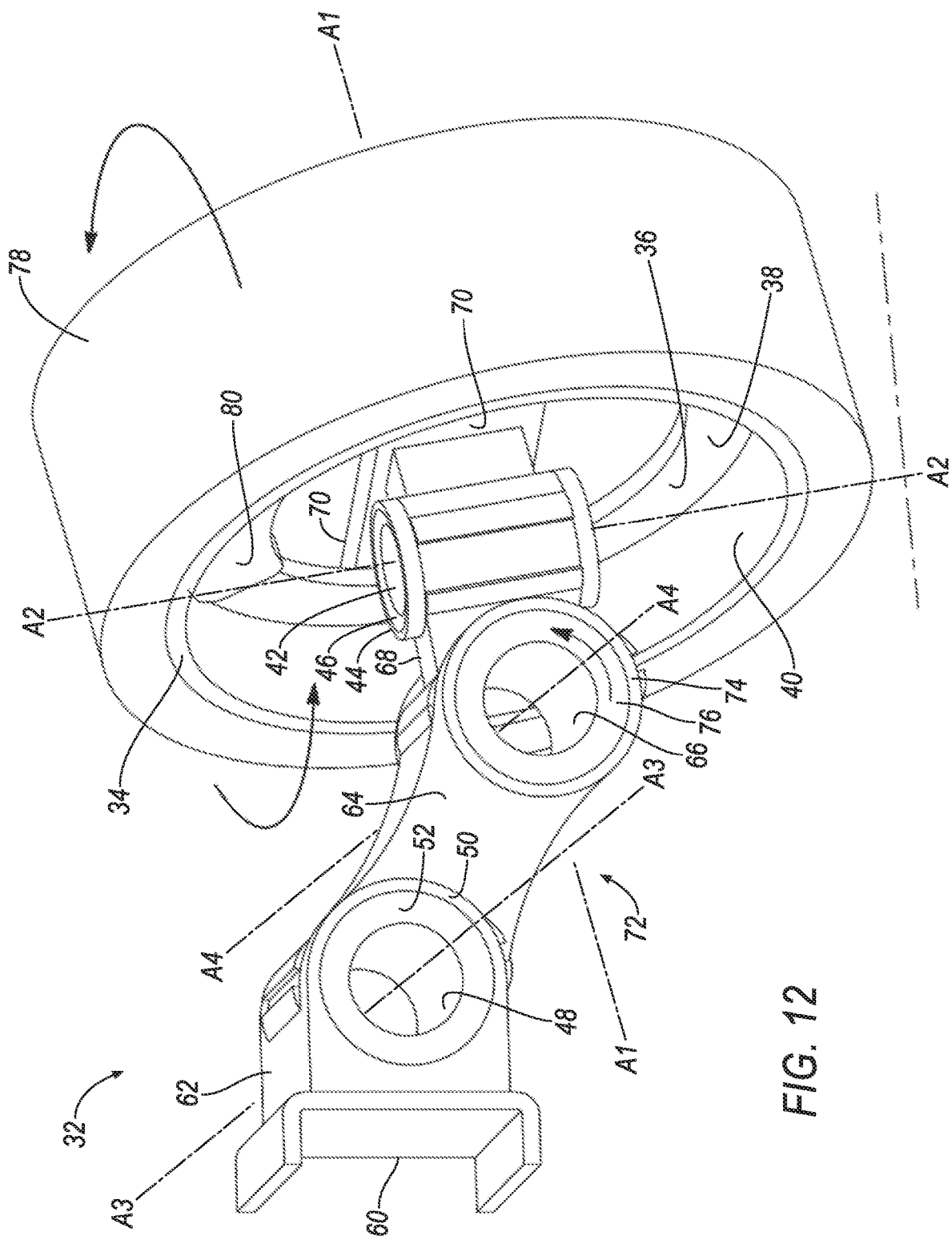
FIGS. 12-13 are perspective views of the wheel assembly with the second and fourth electric motors actuating.
Figure 13:
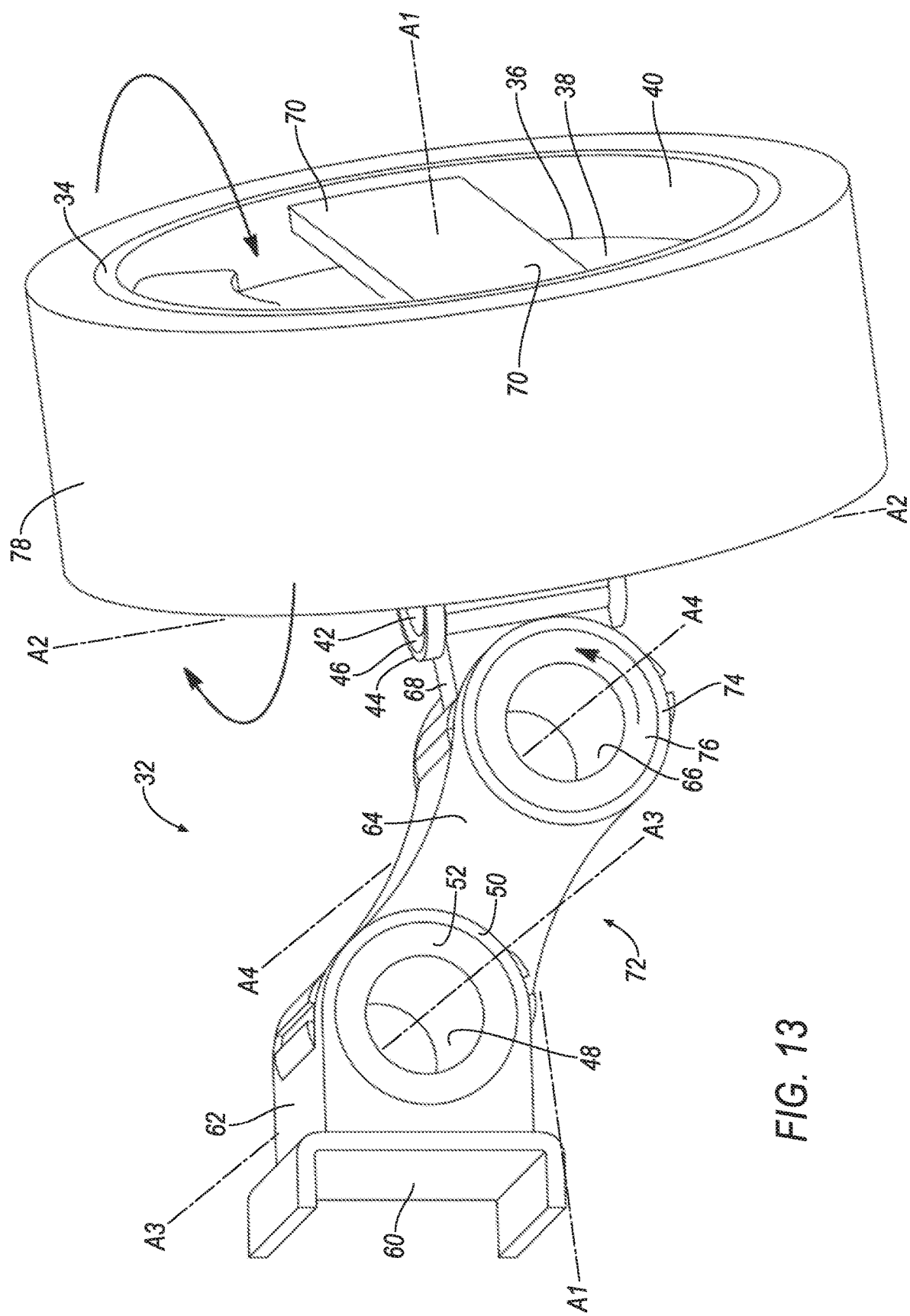
Figure 14:
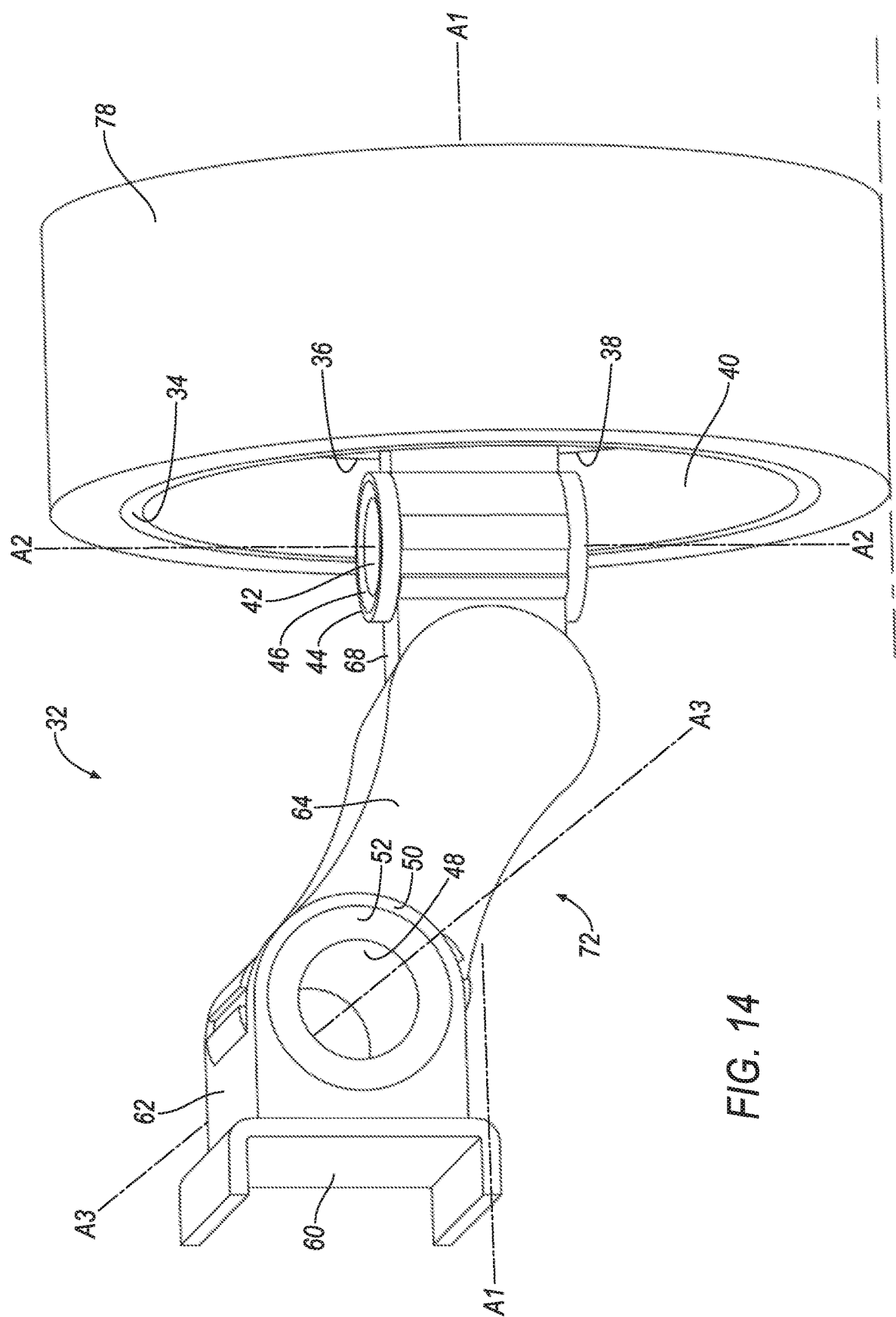
FIG. 14 is a perspective view of another example wheel assembly of the vehicle.
Figure 15:
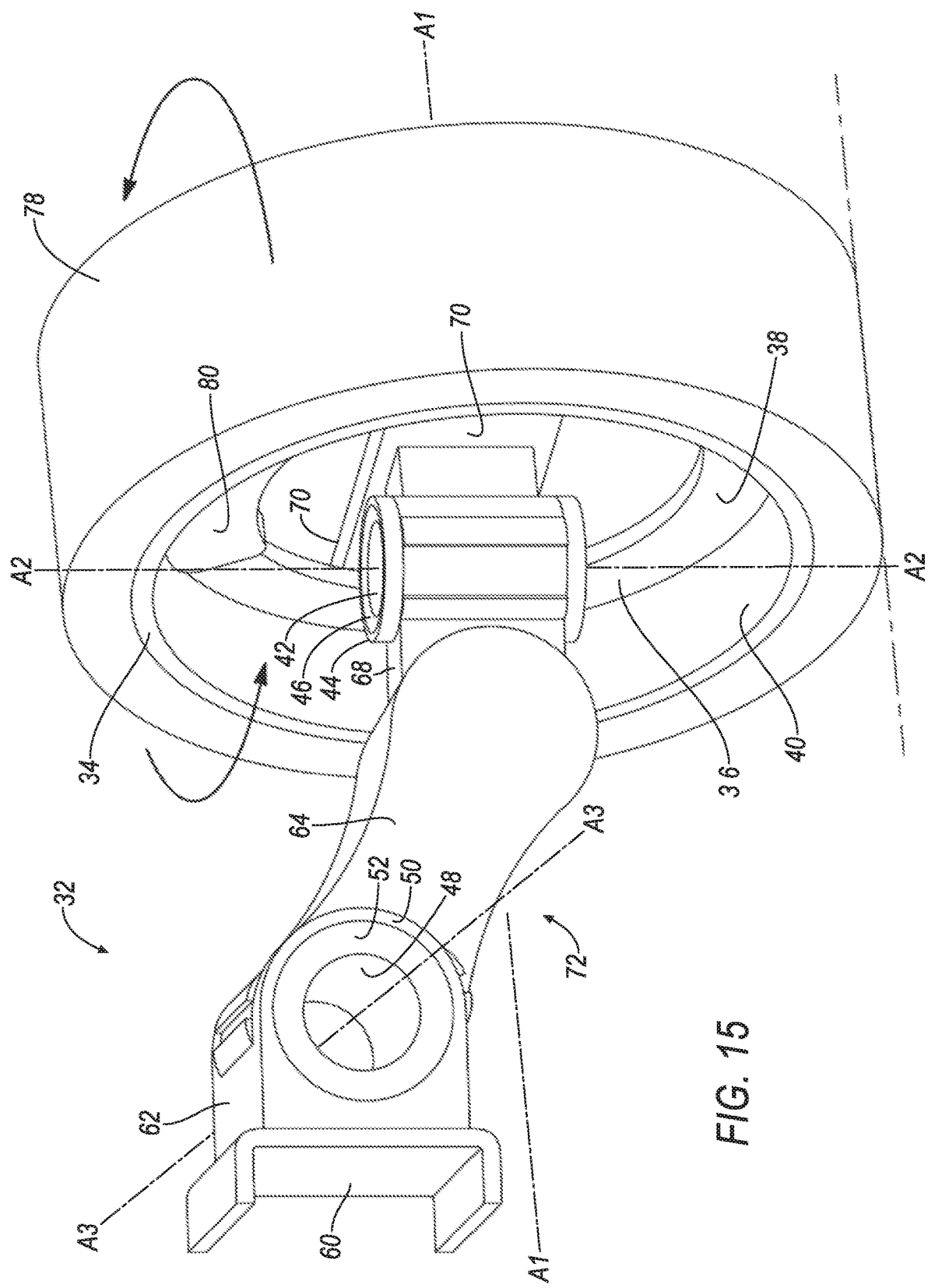
FIGS. 15-16 are perspective views of the wheel assembly with the second electric motor actuating.
Figure 16:
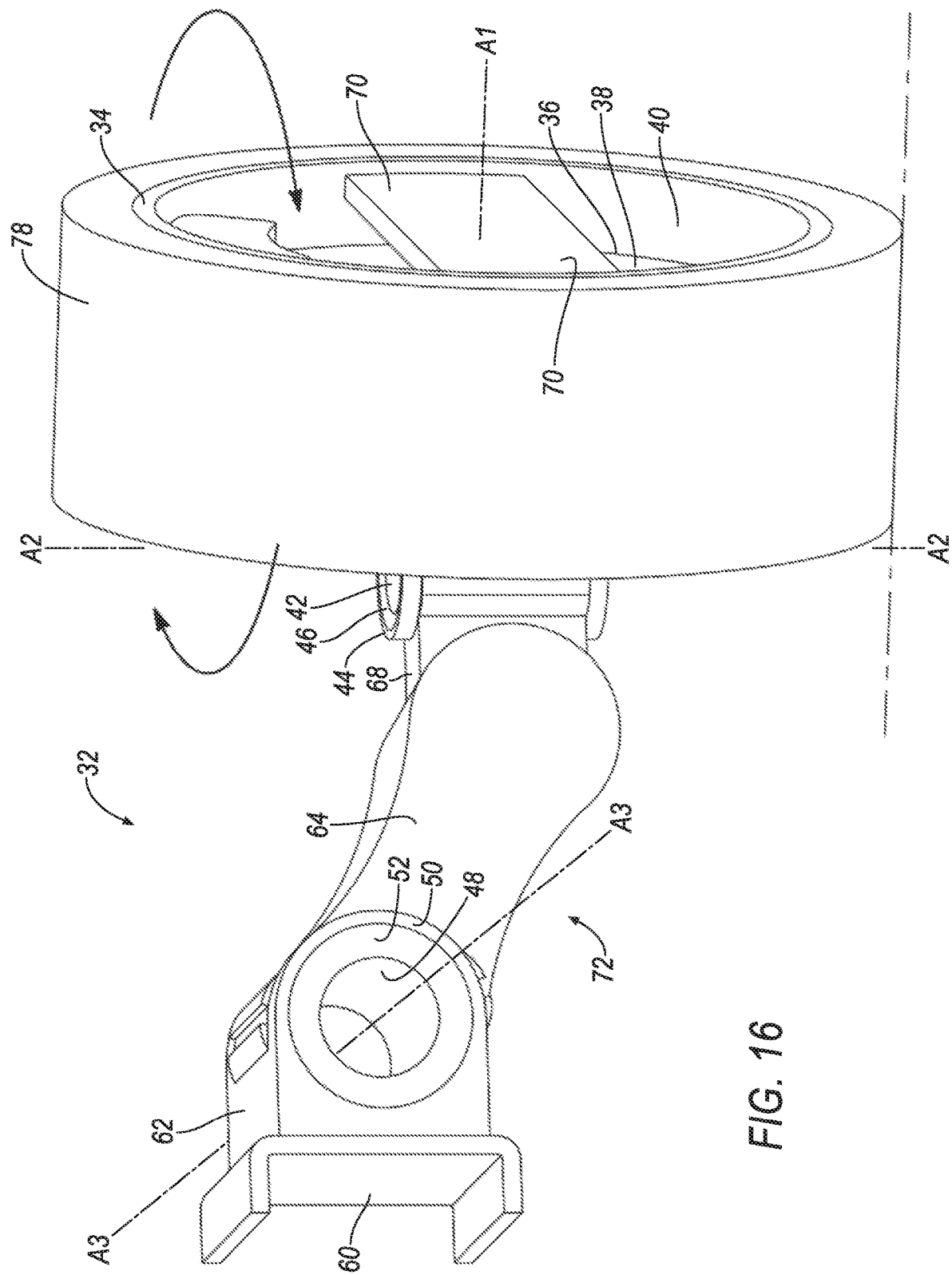
Figure 17:
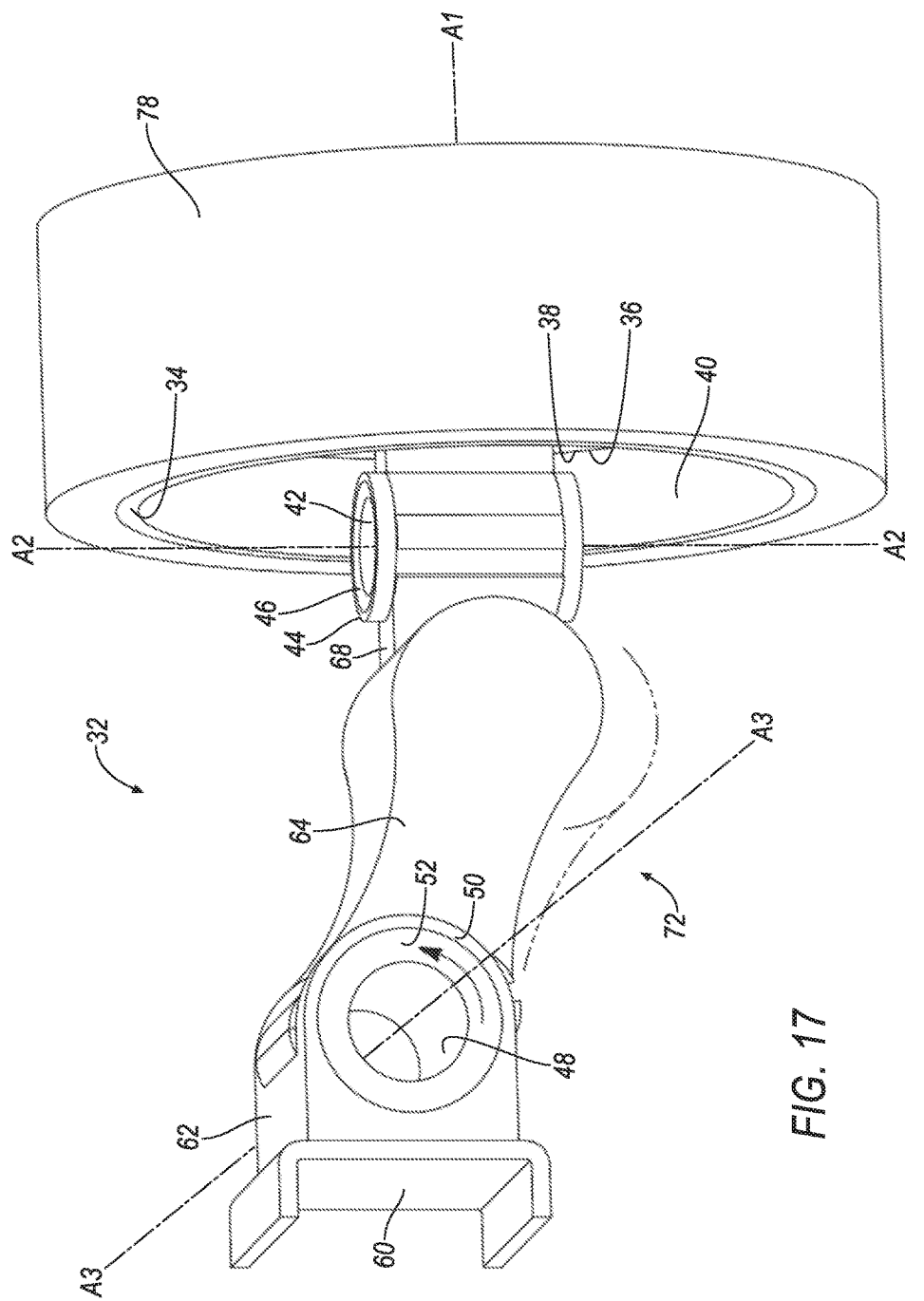
FIG. 17 is a perspective view of the wheel assembly with the third electric motor actuating.
Figure 18:
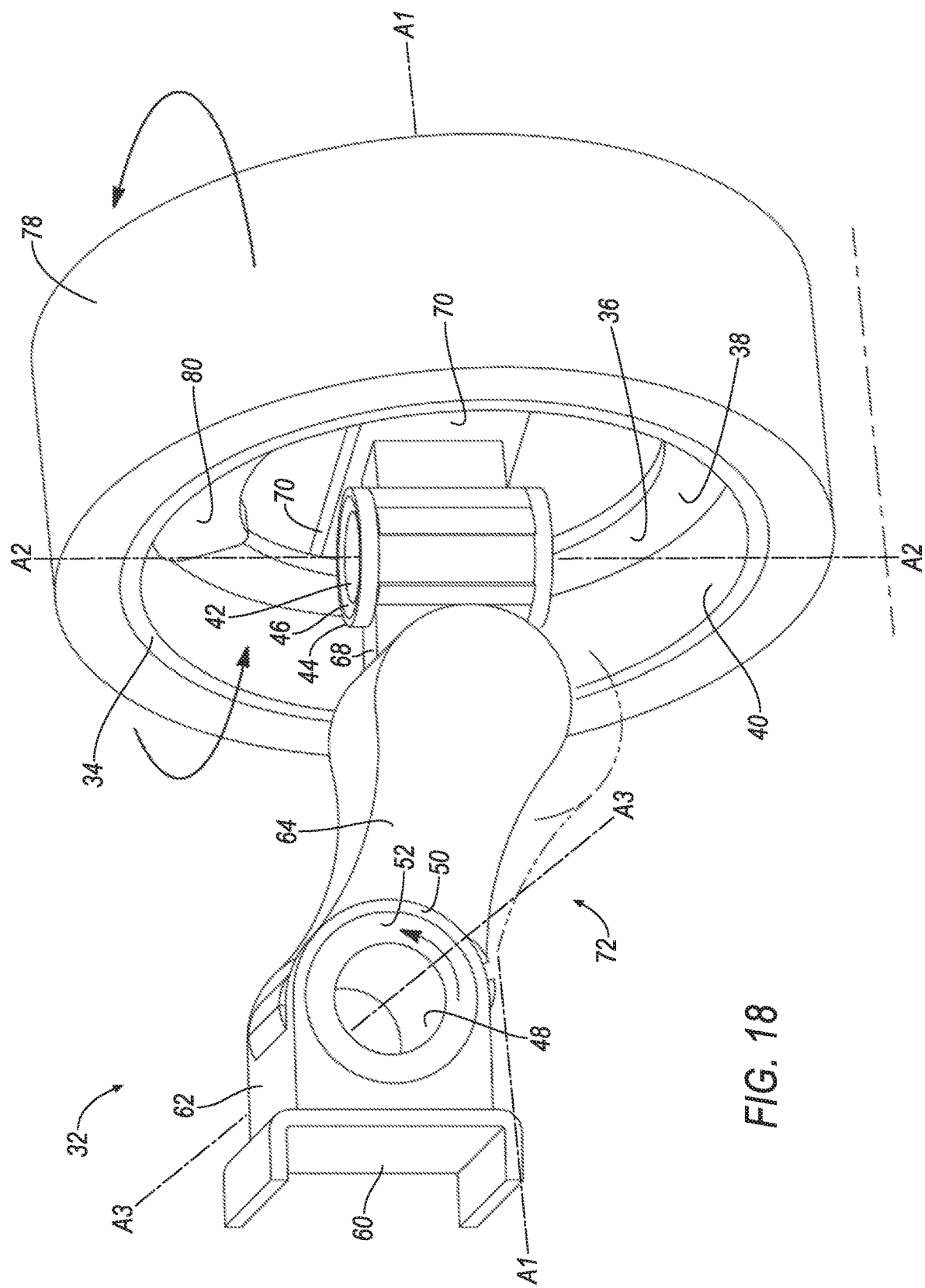
FIGS. 18-19 are perspective views of the wheel assembly with the second and third electric motors actuating.
Figure 19:
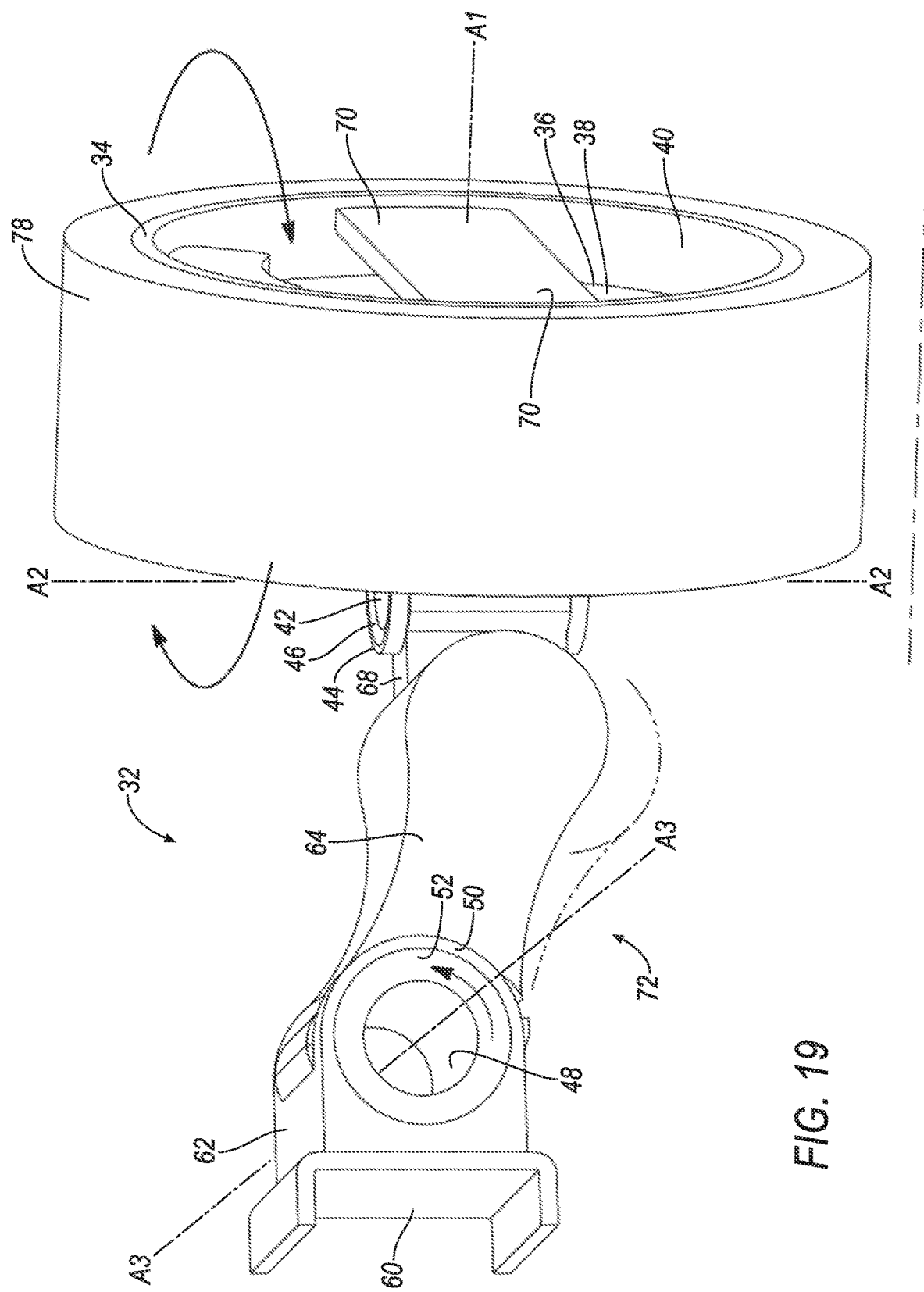
Figure 20:
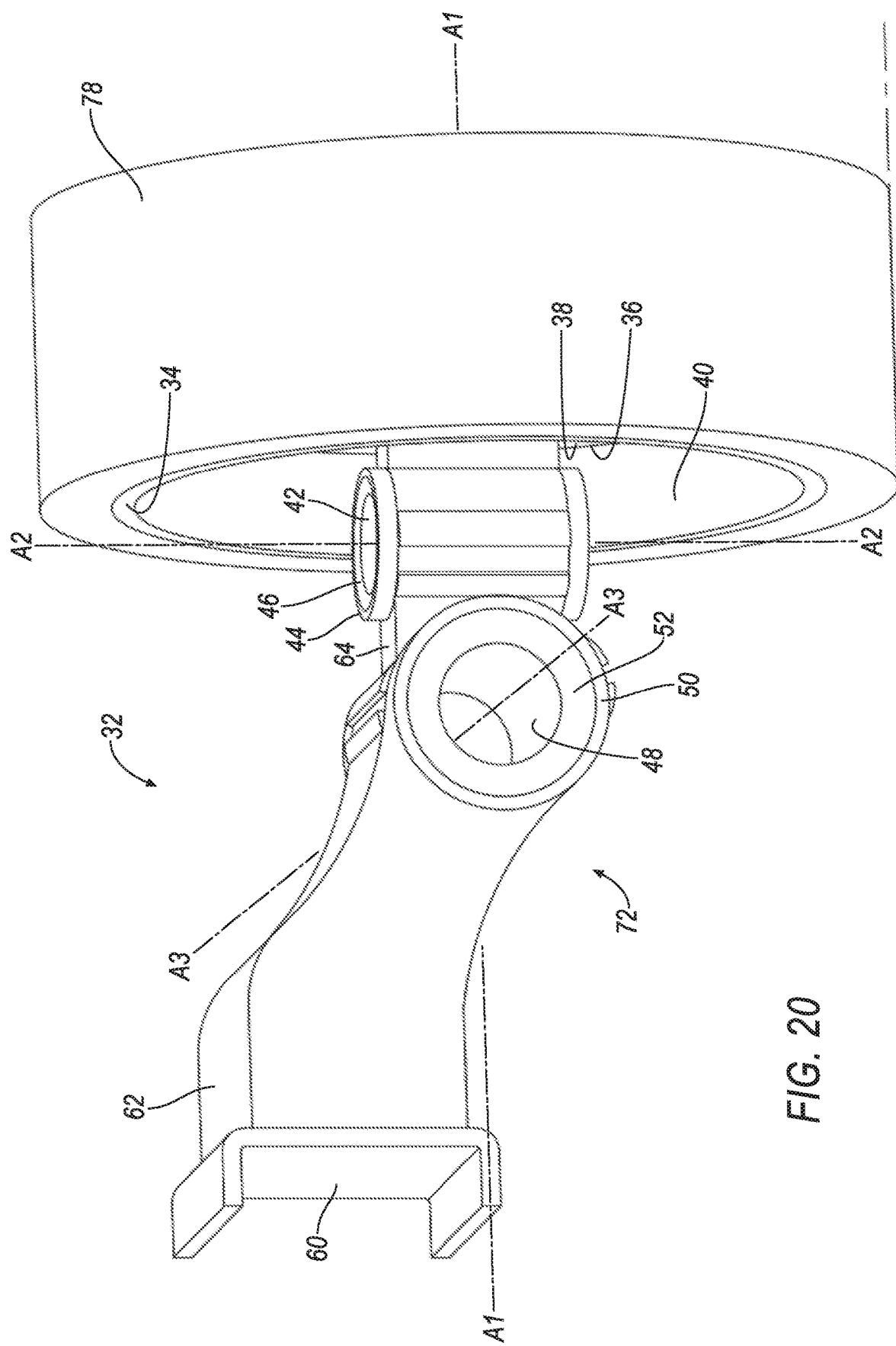
FIG. 20 is a perspective view of another example wheel assembly of the vehicle.
Figure 21:
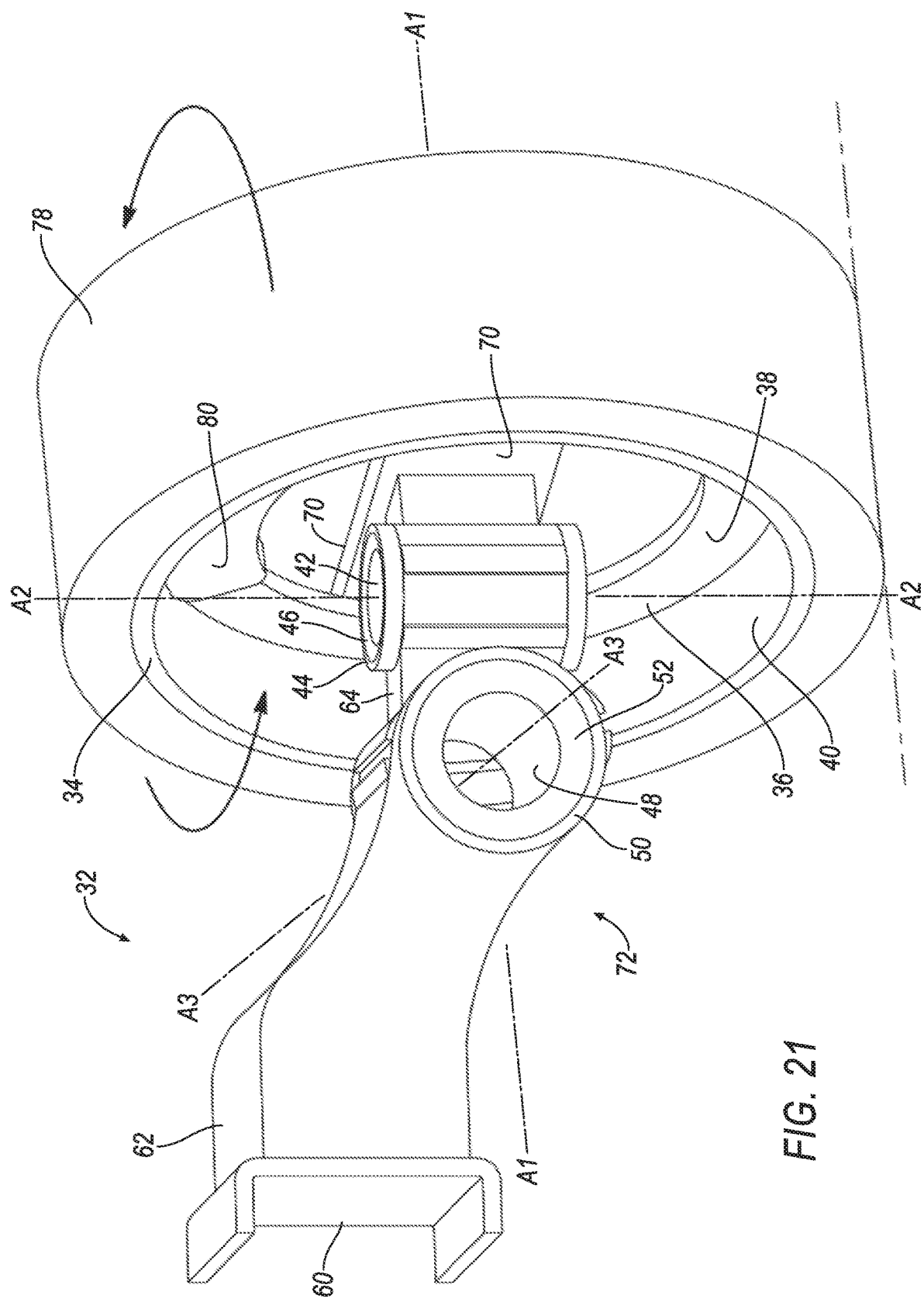
FIGS. 21-22 are perspective views of the wheel assembly with the second electric motor actuating.
Figure 22:
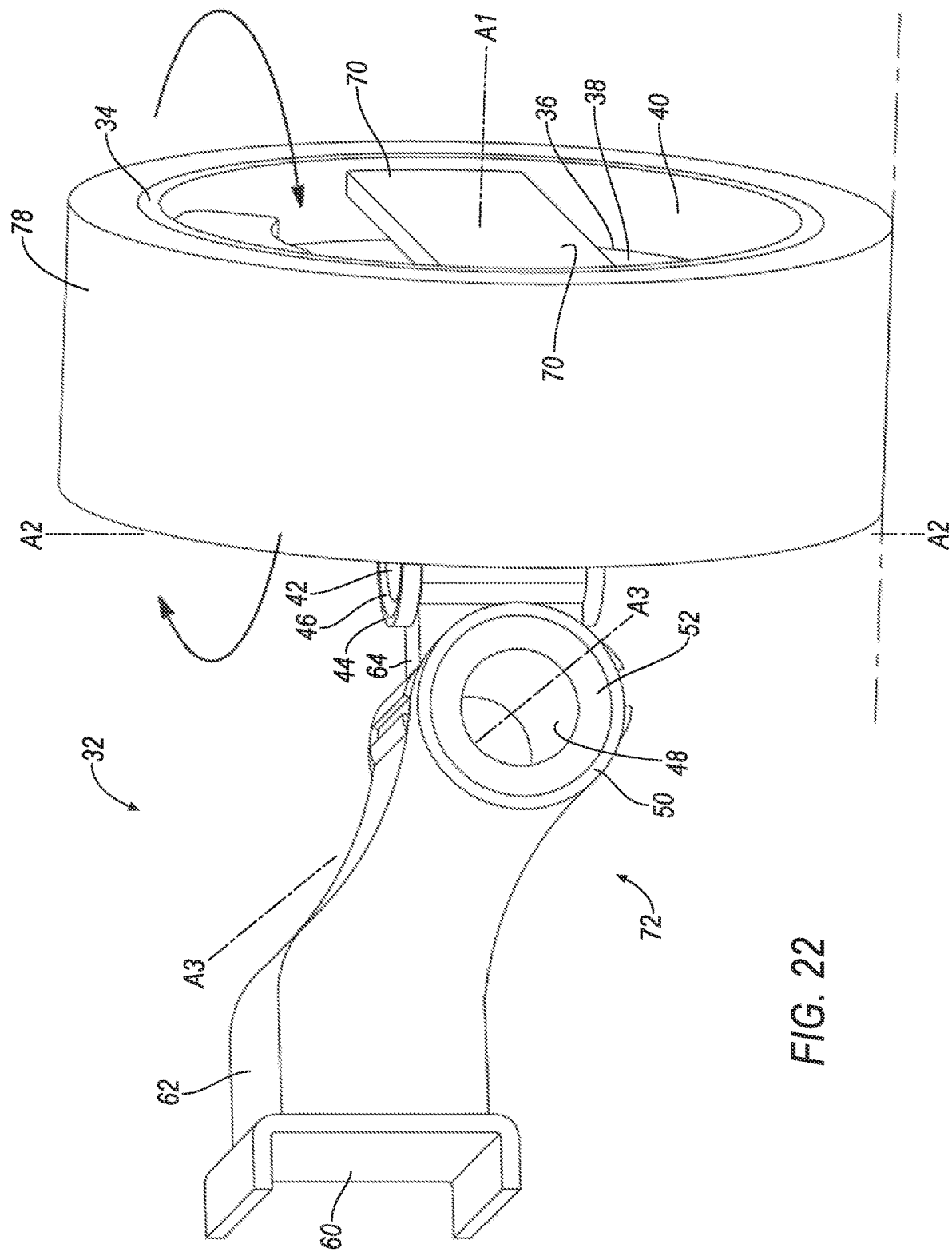
Figure 23:
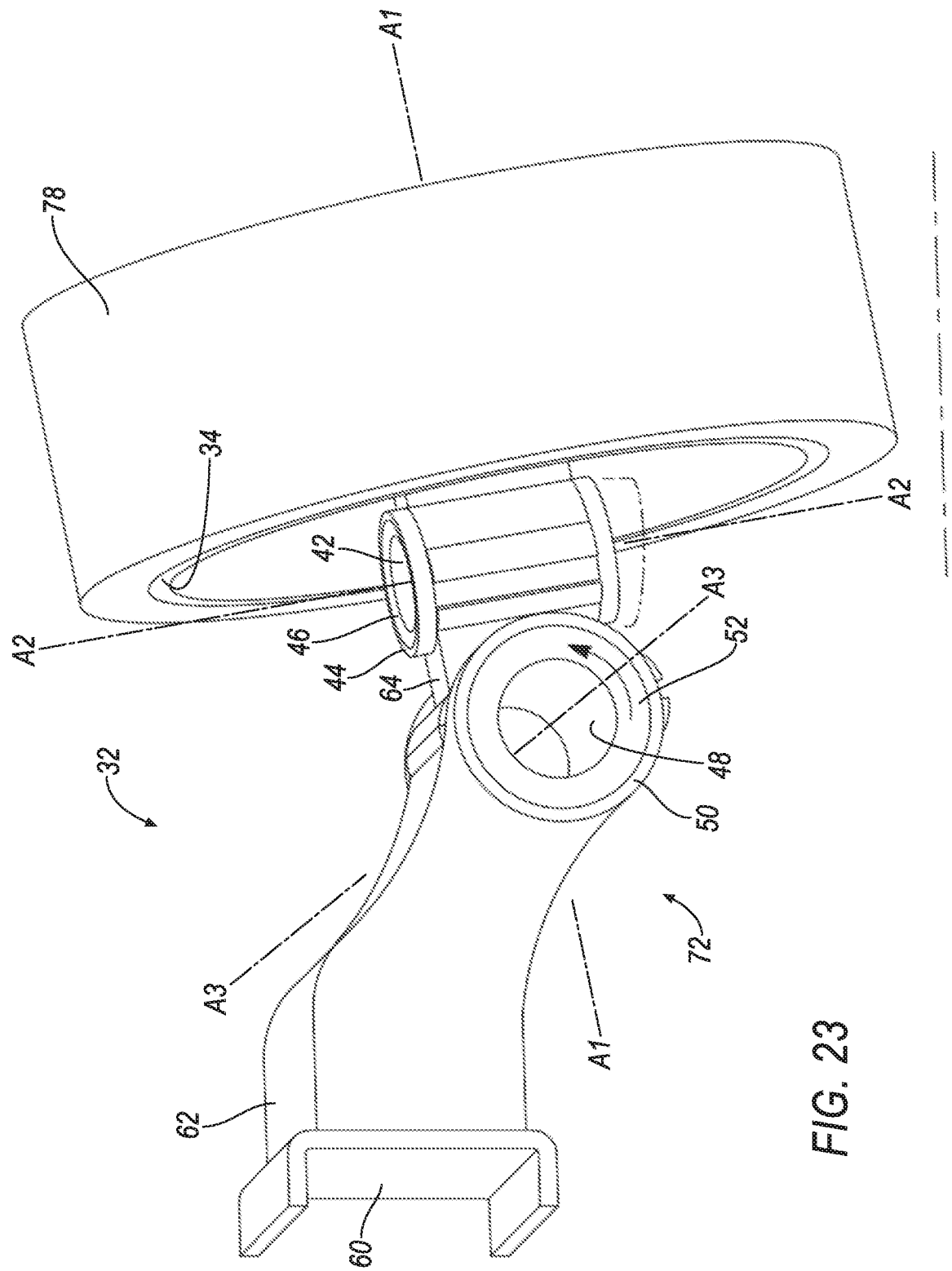
FIG. 23 is a perspective view of the wheel assembly with the third electric motor actuating.
Figure 24:
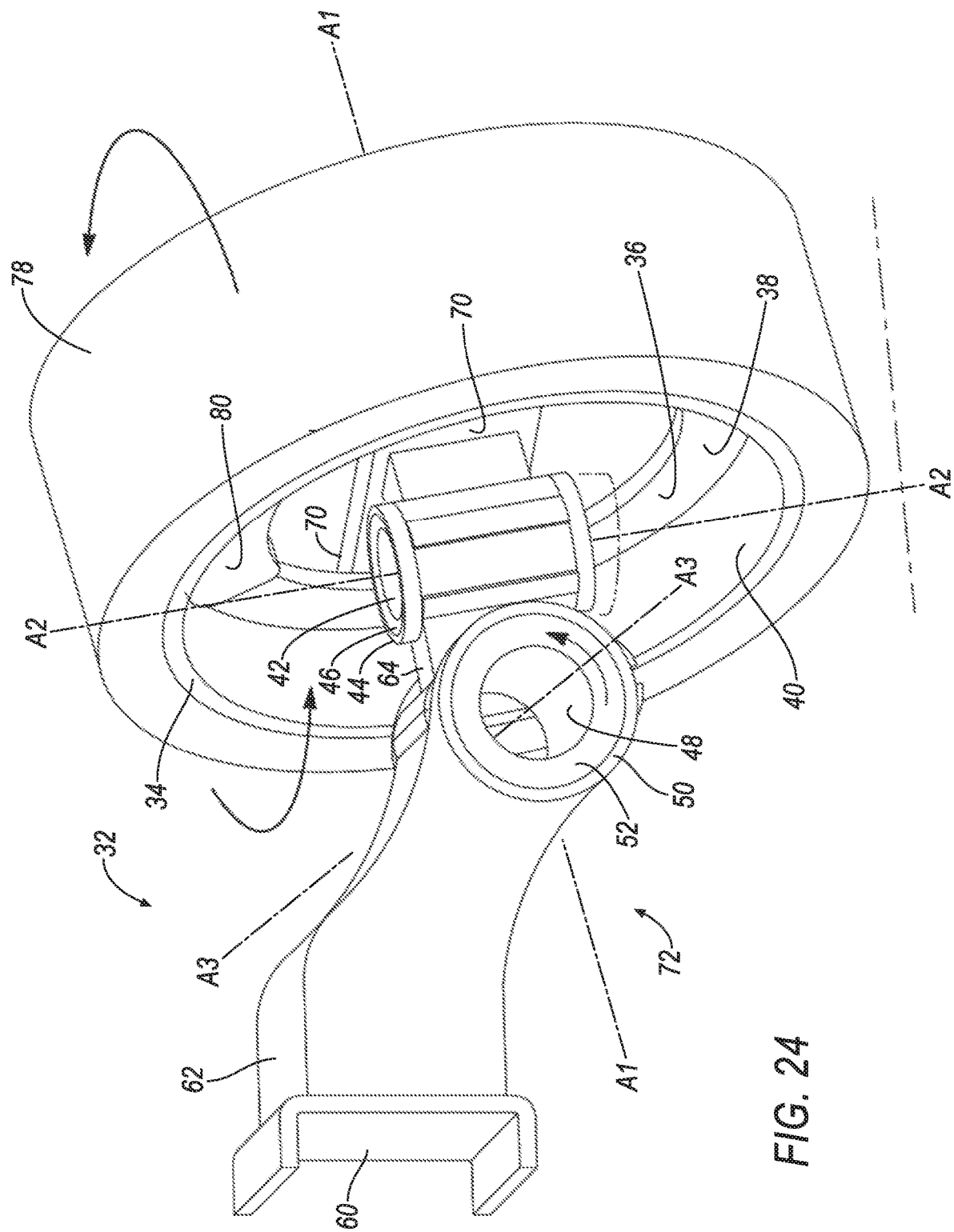
FIGS. 24-25 are perspective views of the wheel assembly with the second and third electric motors actuating.
Figure 25:
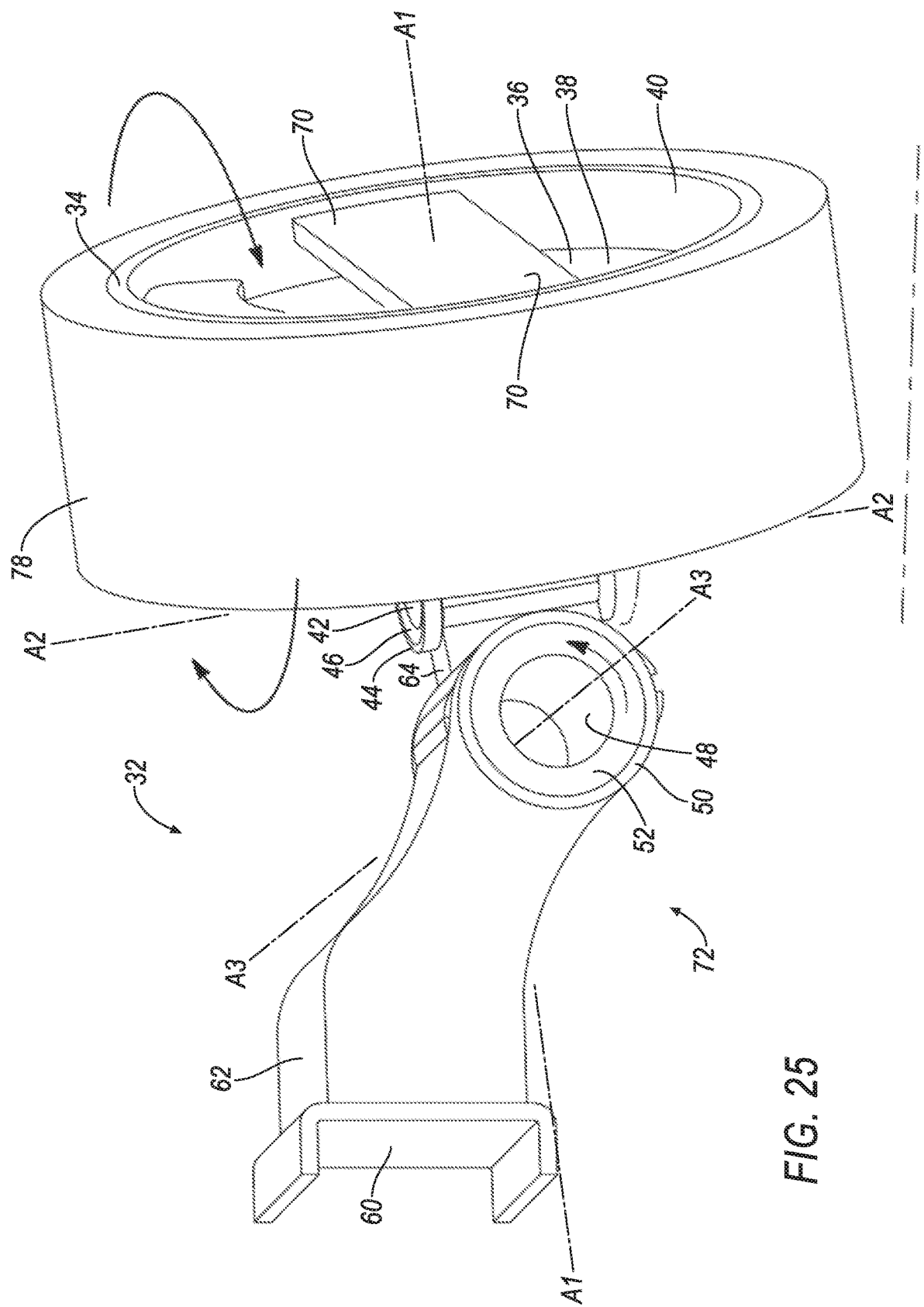

The fourth electric motor 66 can operate with the third electric motor 48 as a suspension system for the wheel 34 relative to the vehicle chassis 54. For example, the third electric motor 48 can allow the wheel 34 to move up and down relative to the vehicle chassis 54 while damping shocks from the road, and the fourth electric motor 66 can correspondingly adjust the tilt of the wheel 34, e.g., so that the wheel 34 maintains zero camber as the wheel 34 moves up and down relative to the vehicle chassis 54. Locating the fourth electric motor 66 at the same level with the wheel 34 allows the fourth electric motor 66 to move vertically with the wheel 34, thus allowing the fourth electric motor 66 to control the tilt of the wheel 34 and the third electric motor 48 to control the vertical position of the wheel 34 relative to the vehicle chassis 54. The control module 82 can be programmed to actuate the fourth electric motor 66 to a position chosen based on the position of the third electric motor 48, in particular, actuate the fourth electric motor 66 to a position that gives the wheel 34 zero camber for the position of the third electric motor 48. The control module 82 can store a lookup table of positions of the third electric motor 48 paired with positions of the fourth electric motor 66. The fourth electric motor 66 is actuatable to lift or lower the wheel 34 relative to the vehicle chassis 54 and/or to tilt the wheel 34, i.e., adjust the camber of the wheel 34, relative to the vehicle chassis 54. For example, the control module 82 can adjust the camber of the wheel 34 by adjusting all the positions of the fourth electric motor 66 in the lookup table by the same amount. Actuation of the fourth electric motor 66 is shown in FIGS. 11-13.

The fourth rotor 76 and the second stator 44 are fixed relative to each other. The lower arm segment 68 extends from the fourth rotor 76 to the second stator 44 and rigidly connects the fourth rotor 76 and the second stator 44. When the third electric motor 48 and the fourth electric motor 66 are in the default positions, the lower arm segment 68 extends in a horizontal outboard direction. The lower arm segment 68 does not include any moving parts.

With reference to the two example wheel assemblies 32 in FIGS. 14-25, the third rotor 52 and the second stator 44 are fixed relative to each other. The upper arm segment 64 extends from the third rotor 52 to the second stator 44 and rigidly connects the third rotor 52 and the second stator 44. The upper arm segment 64 does not include any moving parts. In the example wheel assembly 32 in FIGS. 14-19, the upper arm segment 64 is longer in the direction from the third rotor 52 to the second stator 44 than the mounting-plate segment 62 is in the direction from the mounting plate 60 to the third stator 50. The third electric motor 48 is closer to the mounting plate 60 than to the second electric motor 42, and the third electric motor 48 is positioned above the axis A1. In the example wheel assembly 32 in FIGS. 20-25, the upper arm segment 64 is shorter in the direction from the third rotor 52 to the second stator 44 than the mounting-plate segment 62 is in the direction from the mounting plate 60 to the third stator 50. The third electric motor 48 is closer to the second electric motor 42 than to the mounting plate 60, and the third electric motor 48 is on the axis A1.

With reference to FIGS. 2-25, the second stator 44 is coupled to and movable with the third rotor 52. In the two example wheel assemblies 32 in FIGS. 14-25, the second stator 44 and the third rotor 52 are fixed relative to each other via the upper arm segment 64. In the example wheel assembly 32 in FIGS. 2-13, the second stator 44 is coupled to the third rotor 52 via the fourth electric motor 66, and the second stator 44 is movable by actuation of the third electric motor 48 as well as by actuation of the fourth electric motor 66.

The second electric motor 42 includes the second stator 44 and the second rotor 46 rotatable relative to the second stator 44 about the second axis A2. The second axis A2 is transverse to the third axis A3 and to the fourth axis A4. The second axis A2 is oriented in a vertical direction when the third electric motor 48 and/or the fourth electric motor 66 are in default positions, e.g., zero-camber positions. The second electric motor 42 is disposed on the first axis A1, and the second electric motor 42 can be disposed at least partially inside the wheel 34, i.e., the wheel 34 extends circumferentially around the second electric motor 42.

The second electric motor 42 can operate as a steering system for the vehicle 30. The second electric motor 42 is actuatable to turn the wheel 34 relative to the vehicle chassis 54, as shown in FIGS. 4-7, 9-10, 12-13, 15-16, 18-19, 21-22, and 24-25, e.g., to permit the vehicle 30 to make a turn while driving. The control module 82 is programmed to actuate the second electric motors 42 to positions that are based on a steering-wheel angle received by the control module 82. The control module 82 can store a lookup table of steering-wheel angles with corresponding positions for each of the four second electric motors 42.

The second rotor 46 and the first stator 38 are fixed relative to each other. The struts 70 extend from the second rotor 46 to the first stator 38 and rigidly connect the second rotor 46 and the first stator 38. As shown in the Figures, the wheel assembly 32 includes two struts 70. Each strut 70 extends radially outward relative to the first axis A1 from the second rotor 46 to the first stator 38. The struts 70 can be circumferentially equally spaced around the first axis A1, e.g., two struts 70 positioned 180° from each other around the first axis A1. The struts 70 do not include any moving parts.

The first electric motor 36 includes the first stator 38 and the first rotor 40 rotatable relative to the first stator 38 about the first axis A1. The first stator 38 is fixed relative to the second rotor 46 via the struts 70. The first axis A1 is transverse to the second axis A2, to the third axis A3, and to the fourth axis A4. The first axis A1 is oriented in a horizontal direction when the third electric motor 48 and/or the fourth electric motor 66 are in default positions, e.g., zero-camber positions. The first axis A1 is oriented in a vehicle-lateral direction when the third electric motor 48 and/or the fourth electric motor 66 are in default positions, e.g., the zero-camber positions, and the second electric motor 42 is in a default position, e.g., a straight-ahead position. The first electric motor 36 is disposed at least partially inside the wheel 34, i.e., the wheel 34 extends circumferentially around the first electric motor 36.

The first electric motor 36 can operate as a propulsion system for the vehicle 30. The first electric motor 36 is actuatable to spin the wheel 34 around the first axis A1, i.e., to drive the vehicle 30 forward or in reverse. The control module 82 is programmed to actuate the first electric motors 36 at rates of rotation that are based on an accelerator-pedal position received by the control module 82. The control module 82 can store a lookup table of accelerator-pedal positions with a corresponding rate of rotation for the four first electric motors 36. The control module 82 can also be programmed to individually adjust the rates of rotation of each of the four first electric motors 36 based on a steering-wheel angle, e.g., giving higher rates of rotation to the first electric motors 36 on the outside of the turn and lower rates of rotation to the first electric motors 36 on the inside of the turn. The first electric motor 36 may also operate as a regenerative braking system for the vehicle 30, i.e., generating energy by slowing a speed of rotation of the wheel 34 about the first axis A1.

The wheel 34 has an annular shape that defines the first axis A1. The wheel 34 is fixed relative to the first rotor 40, i.e., rotates with the first rotor 40. The wheel 34 extends circumferentially around the first electric motor 36. The wheel 34 can provide a mounting location for a tire 78, which can extend circumferentially around the wheel 34. When the vehicle 30 is driving, the tire 78 contacts the road.

The wheel assembly 32 includes a friction brake 80. The friction brake 80 provides stopping power through friction between a component rotating with the wheel and a component stationary relative to the first stator 38. The friction brake 80 may be a disc brake, drum brake, band brake, or any other suitable type of brake.

In general, the computing systems and/or devices described may employ any of a number of computer operating systems, including, but by no means limited to, versions and/or varieties of the the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," and "fourth" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A wheel assembly comprising:
   a wheel defining a first axis;
   a first electric motor including a first stator and a first rotor rotatable relative to the first stator about the first axis, the wheel fixed relative to the first rotor;
   a second electric motor including a second stator and a second rotor rotatable relative to the second stator about a second axis, the first stator fixed relative to the second rotor; and
   a third electric motor including a third stator and a third rotor rotatable relative to the third stator about a third axis, the second stator coupled to and movable with the third rotor;
   wherein the first axis, the second axis, and the third axis are mutually transverse.

2. The wheel assembly of claim 1, further comprising a mounting plate fixed relative to the third stator.

3. The wheel assembly of claim 2, further comprising a vehicle chassis member to which the mounting plate is mounted.

4. The wheel assembly of claim 3, wherein the first axis is oriented in a vehicle-lateral direction, the second axis is oriented in a vertical direction when the third electric motor is in a default position, and the third axis is oriented in a vehicle-forward direction when the third electric motor is in a default position and the second electric motor is in a default position.

5. The wheel assembly of claim 2, further comprising an arm extending from the mounting plate and including the first electric motor, the second electric motor, and the third electric motor, wherein the wheel is connected to the mounting plate only via the arm.

6. The wheel assembly of claim 5, wherein
   the arm includes a fourth electric motor including a fourth stator and a fourth rotor rotatable relative to the fourth stator about a fourth axis;
   the second stator is fixed relative to the fourth rotor, and the fourth stator is fixed relative to the third rotor.

7. The wheel assembly of claim 2, further comprising a mounting-plate segment extending from the third stator to the mounting plate and rigidly connecting the third stator and the mounting plate.

8. The wheel assembly of claim 1, wherein the wheel extends circumferentially around the first electric motor.

9. The wheel assembly of claim 1, wherein the second electric motor is disposed inside the wheel.

10. The wheel assembly of claim 1, wherein the first electric motor extends circumferentially around the second electric motor.

11. The wheel assembly of claim 1, further comprising a strut extending radially outward relative to the first axis from the second rotor to the first stator.

12. The wheel assembly of claim 1, further comprising a fourth electric motor including a fourth stator and a fourth rotor rotatable relative to the fourth stator about a fourth axis, wherein the second stator is fixed relative to the fourth rotor, and the fourth stator is fixed relative to the third rotor.

13. The wheel assembly of claim 12, wherein the third axis and the fourth axis are parallel.

14. The wheel assembly of claim 12, further comprising an arm segment extending from the fourth stator to the third rotor and rigidly connecting the fourth stator and the third rotor.

15. The wheel assembly of claim 12, further comprising an arm segment extending from the second stator to the fourth rotor and rigidly connecting the second stator and the fourth rotor.

16. The wheel assembly of claim 12, wherein the fourth electric motor is a radial flux electric motor.

17. The wheel assembly of claim 1, wherein the first electric motor is a radial flux electric motor.

18. The wheel assembly of claim 1, wherein the second electric motor is a radial flux electric motor.

19. The wheel assembly of claim 1, wherein the third electric motor is a radial flux electric motor.

20. A vehicle comprising:
a vehicle chassis; and
four wheel assemblies mounted to the vehicle chassis;
wherein each wheel assembly includes:
- a wheel defining a first axis;
- a first electric motor including a first stator and a first rotor rotatable relative to the first stator about the first axis, the wheel fixed relative to the first rotor;
- a second electric motor including a second stator and a second rotor rotatable relative to the second stator about a second axis, the first stator fixed relative to the second rotor; and
- a third electric motor including a third stator and a third rotor rotatable relative to the third stator about a third axis, the second stator coupled to and movable with the third rotor, the first axis, the second axis, and the third axis being mutually transverse.

* * * * *